United States Patent
Chailleux

(10) Patent No.: US 7,360,159 B2
(45) Date of Patent: Apr. 15, 2008

(54) SYSTEM FOR CREATING MEDIA PRESENTATIONS OF COMPUTER SOFTWARE APPLICATION PROGRAMS

(75) Inventor: Alexandre Chailleux, San Jose, CA (US)

(73) Assignee: Qarbon.com, Inc., San Jose, CA (US)

( * ) Notice: Subject to any disclaimer, the term of this patent is extended or adjusted under 35 U.S.C. 154(b) by 992 days.

(21) Appl. No.: 10/665,886

(22) Filed: Sep. 18, 2003

(65) Prior Publication Data
US 2005/0278629 A1      Dec. 15, 2005

Related U.S. Application Data

(62) Division of application No. 10/121,117, filed on Apr. 10, 2002, now abandoned, which is a division of application No. 09/357,556, filed on Jul. 16, 1999, now Pat. No. 6,404,441.

(51) Int. Cl.
*G06F 3/00* (2006.01)
(52) U.S. Cl. ...................... 715/709; 715/731; 715/704; 715/732; 715/861; 715/977
(58) Field of Classification Search ................ 715/977, 715/709, 731, 704, 732, 861
See application file for complete search history.

(56) References Cited

U.S. PATENT DOCUMENTS

| | | |
|---|---|---|
| 3,848,193 A | 11/1974 | Martin et al. |
| 3,987,398 A | 10/1976 | Fung |
| 4,100,569 A | 7/1978 | Vlahos |
| 4,170,782 A | 10/1979 | Miller |
| 4,186,413 A | 1/1980 | Mortimer |
| 4,224,644 A | 9/1980 | Lewis et al. |
| 4,287,592 A | 9/1981 | Paulish et al. |
| 4,288,809 A | 9/1981 | Yabe |

(Continued)

FOREIGN PATENT DOCUMENTS

EP      0113022 A3      11/1983

(Continued)

OTHER PUBLICATIONS

Kass, Andrew Jonathan; *An Interchange Standard and System for Browsing Digital Documents*; M.I.T.; May, 1995; pp. 1-105; U.S.A.

(Continued)

*Primary Examiner*—Sy D. Luu
(74) *Attorney, Agent, or Firm*—Townsend and Townsend and Crew, LLP

(57) ABSTRACT

A system for producing presentations of computer application programs that also allows the inclusion of advertising, or other information, into a presentation and which can be updated by a central ad server. When the presentation is viewed offline, default ads are kept in the presentation. Authoring software is used to create a sequence of screenshot images of an application program to be presented. Each screenshot is a slide in the presentation and is displayed for an interval of time during playback of the presentation. Text description in the form of "bubble text," "memo text," "questions," etc. can be specified along with the position, size and other properties of the text. Characteristics such as cursor shape, speed of movement, starting and ending positions, alignment, etc. can be set, and a "click area" in association with a question, or prompt, to the viewer of the presentation can be specified. After a sequence has been completed, the sequence is compressed into a small self-contained package which includes two files that can be played back without a dedicated engine or specialized application that requires a separate download.

81 Claims, 19 Drawing Sheets

U.S. PATENT DOCUMENTS

| | | |
|---|---|---|
| 4,305,101 A | 12/1981 | Yarbrough et al. |
| 4,307,446 A | 12/1981 | Barton et al. |
| 4,338,644 A | 7/1982 | Staar |
| 4,347,498 A | 8/1982 | Lee et al. |
| 4,381,522 A | 4/1983 | Lambert |
| 4,405,946 A | 9/1983 | Knight |
| 4,429,385 A | 1/1984 | Cichelli et al. |
| 4,476,488 A | 10/1984 | Merrell |
| 4,477,695 A | 10/1984 | Buck |
| 4,488,179 A | 12/1984 | Kruger et al. |
| 4,533,910 A | 8/1985 | Sukonick et al. |
| 4,536,791 A | 8/1985 | Campbell et al. |
| 4,555,775 A | 11/1985 | Pike |
| 4,575,579 A | 3/1986 | Simon et al. |
| 4,602,279 A | 7/1986 | Freeman |
| 4,622,545 A | 11/1986 | Atkinson |
| 4,641,205 A | 2/1987 | Beyers, Jr. |
| 4,645,873 A | 2/1987 | Chomet |
| 4,648,062 A | 3/1987 | Johnson et al. |
| 4,677,466 A | 6/1987 | Lert, Jr. et al. |
| 4,689,737 A | 8/1987 | Grant |
| 4,691,351 A | 9/1987 | Hayashi et al. |
| 4,691,354 A | 9/1987 | Palminteri |
| 4,698,682 A | 10/1987 | Astle |
| 4,700,181 A | 10/1987 | Maine et al. |
| 4,701,794 A | 10/1987 | Froling et al. |
| 4,703,423 A | 10/1987 | Bado et al. |
| 4,706,121 A | 11/1987 | Young |
| 4,706,212 A | 11/1987 | Toma |
| 4,719,567 A | 1/1988 | Whittington et al. |
| RE32,632 E | 3/1988 | Atkinson |
| 4,748,618 A | 5/1988 | Brown et al. |
| 4,751,578 A | 6/1988 | Reiter et al. |
| 4,751,669 A | 6/1988 | Sturgis et al. |
| 4,768,110 A | 8/1988 | Dunlap et al. |
| 4,772,882 A | 9/1988 | Mical |
| 4,775,935 A | 10/1988 | Yourick |
| 4,783,833 A | 11/1988 | Kawabata et al. |
| 4,785,408 A | 11/1988 | Britton et al. |
| 4,788,682 A | 11/1988 | Vij et al. |
| 4,799,146 A | 1/1989 | Chauvel |
| 4,812,834 A | 3/1989 | Wells |
| 4,815,030 A | 3/1989 | Cross et al. |
| 4,821,102 A | 4/1989 | Ichikawa et al. |
| 4,823,122 A | 4/1989 | Mann et al. |
| 4,827,404 A | 5/1989 | Barstow et al. |
| 4,829,569 A | 5/1989 | Seth-Smith et al. |
| 4,831,556 A | 5/1989 | Oono |
| 4,847,604 A | 7/1989 | Doyle |
| 4,866,700 A | 9/1989 | Berry et al. |
| 4,868,866 A | 9/1989 | Williams, Jr. |
| 4,873,662 A | 10/1989 | Sargent |
| 4,884,223 A | 11/1989 | Ingle et al. |
| 4,890,321 A | 12/1989 | Seth-Smith et al. |
| 4,899,136 A | 2/1990 | Beard et al. |
| 4,899,377 A | 2/1990 | Bauer et al. |
| 4,899,394 A | 2/1990 | Lee |
| 4,908,707 A | 3/1990 | Kinghorn |
| 4,908,713 A | 3/1990 | Levine |
| 4,914,732 A | 4/1990 | Henderson et al. |
| 4,931,783 A | 6/1990 | Atkinson |
| 4,935,865 A | 6/1990 | Rowe et al. |
| 4,939,507 A | 7/1990 | Beard et al. |
| 4,939,508 A | 7/1990 | Lawrence et al. |
| 4,961,070 A | 10/1990 | Maher et al. |
| 4,968,132 A | 11/1990 | Ferren |
| 4,974,149 A | 11/1990 | Valenti |
| 4,975,904 A | 12/1990 | Mann et al. |
| 4,975,905 A | 12/1990 | Mann et al. |
| 4,977,455 A | 12/1990 | Young |
| 4,987,486 A | 1/1991 | Johnson et al. |
| 4,991,011 A | 2/1991 | Johnson et al. |
| 4,992,940 A | 2/1991 | Dworkin |
| 4,994,908 A | 2/1991 | Kuban et al. |
| 5,001,554 A | 3/1991 | Johnson et al. |
| 5,008,853 A | 4/1991 | Bly et al. |
| 5,027,400 A | 6/1991 | Baji et al. |
| 5,041,992 A | 8/1991 | Cunningham et al. |
| 5,050,105 A | 9/1991 | Peters |
| 5,053,883 A | 10/1991 | Johnson |
| 5,058,108 A | 10/1991 | Mann et al. |
| 5,062,060 A | 10/1991 | Kolnick |
| 5,072,412 A | 12/1991 | Henderson, Jr. et al. |
| 5,075,771 A | 12/1991 | Hashimoto |
| 5,077,607 A | 12/1991 | Johnson et al. |
| 5,093,718 A | 3/1992 | Hoarty et al. |
| 5,099,319 A | 3/1992 | Esch et al. |
| 5,099,420 A | 3/1992 | Baxlow et al. |
| 5,105,184 A | 4/1992 | Pirani et al. |
| 5,111,409 A | 5/1992 | Gasper et al. |
| 5,133,075 A | 7/1992 | Risch |
| 5,140,678 A | 8/1992 | Torres |
| 5,142,618 A | 8/1992 | Fujiwara et al. |
| 5,148,154 A | 9/1992 | MacKay et al. |
| 5,151,789 A | 9/1992 | Young |
| 5,151,998 A | 9/1992 | Capps |
| 5,155,806 A | 10/1992 | Hoeber et al. |
| 5,157,768 A | 10/1992 | Hoeber et al. |
| 5,165,012 A | 11/1992 | Crandall et al. |
| 5,174,759 A | 12/1992 | Preston et al. |
| 5,177,680 A | 1/1993 | Tsukino et al. |
| 5,179,654 A | 1/1993 | Richards et al. |
| 5,182,640 A | 1/1993 | Takano |
| 5,187,787 A | 2/1993 | Skeen et al. |
| 5,199,066 A | 3/1993 | Logan |
| 5,200,823 A | 4/1993 | Yoneda et al. |
| 5,204,969 A | 4/1993 | Capps et al. |
| 5,220,420 A | 6/1993 | Hoarty et al. |
| 5,220,501 A | 6/1993 | Lawlor et al. |
| 5,220,564 A | 6/1993 | Tuch et al. |
| 5,220,657 A | 6/1993 | Bly et al. |
| 5,230,048 A | 7/1993 | Moy |
| 5,231,493 A | 7/1993 | Apitz |
| 5,235,679 A | 8/1993 | Yoshizawa et al. |
| 5,247,651 A | 9/1993 | Clarisse |
| 5,253,065 A | 10/1993 | Richards et al. |
| 5,261,041 A | 11/1993 | Susman |
| 5,261,042 A | 11/1993 | Brandt |
| 5,265,033 A | 11/1993 | Vajk et al. |
| 5,267,034 A | 11/1993 | Miyatake et al. |
| 5,276,869 A | 1/1994 | Forrest et al. |
| 5,283,639 A | 2/1994 | Esch et al. |
| 5,283,731 A | 2/1994 | Lalonde et al. |
| 5,285,272 A | 2/1994 | Bradley et al. |
| 5,285,442 A | 2/1994 | Iwamura et al. |
| 5,287,448 A | 2/1994 | Nicol et al. |
| 5,301,028 A | 4/1994 | Banker et al. |
| 5,305,195 A | 4/1994 | Murphy |
| 5,311,577 A | 5/1994 | Madrid et al. |
| 5,313,455 A | 5/1994 | van der Wal et al. |
| 5,319,455 A | 6/1994 | Hoarty et al. |
| 5,319,707 A | 6/1994 | Wasilewski et al. |
| 5,321,740 A | 6/1994 | Gregorek et al. |
| 5,325,423 A | 6/1994 | Lewis |
| 5,327,554 A | 7/1994 | Palazzi, III et al. |
| 5,337,155 A | 8/1994 | Cornelis |
| 5,339,239 A | 8/1994 | Manabe et al. |
| 5,343,300 A | 8/1994 | Hennig |
| 5,345,594 A | 9/1994 | Tsuda |
| 5,347,632 A | 9/1994 | Filepp et al. |
| 5,349,658 A * | 9/1994 | O'Rourke et al. .......... 715/839 |
| 5,353,218 A | 10/1994 | De Lapa et al. |
| 5,355,480 A | 10/1994 | Smith et al. |
| 5,355,501 A | 10/1994 | Gross et al. |

| | | | | | | |
|---|---|---|---|---|---|---|
| 5,357,276 A | 10/1994 | Banker et al. | | 5,708,845 A | 1/1998 | Wistendahl et al. |
| 5,361,091 A | 11/1994 | Hoarty et al. | | 5,740,549 A | 4/1998 | Reilly et al. |
| 5,361,393 A | 11/1994 | Rossillo | | 5,745,738 A | 4/1998 | Ricard |
| 5,363,482 A | 11/1994 | Victor et al. | | 5,748,190 A | 5/1998 | Kjorsvik |
| 5,377,319 A | 12/1994 | Kitahara et al. | | 5,751,281 A | 5/1998 | Hoddie et al. |
| 5,388,993 A | 2/1995 | McKiel et al. | | 5,760,767 A | 6/1998 | Shore et al. |
| 5,390,172 A | 2/1995 | Kuang | | 5,760,771 A | 6/1998 | Blonder et al. |
| 5,404,316 A | 4/1995 | Klingler et al. | | 5,764,901 A | 6/1998 | Skarbo et al. |
| 5,404,505 A | 4/1995 | Levinson | | 5,767,897 A | 6/1998 | Howell |
| 5,412,416 A | 5/1995 | Nemirofsky | | 5,781,894 A | 7/1998 | Petrecca et al. |
| 5,414,773 A | 5/1995 | Handelman | | 5,796,945 A | 8/1998 | Tarabella |
| 5,426,427 A | 6/1995 | Chinnock et al. | | 5,806,079 A | 9/1998 | Rivette et al. |
| 5,428,606 A | 6/1995 | Moskowitz | | 5,808,610 A | 9/1998 | Benson et al. |
| 5,434,678 A | 7/1995 | Abecassis | | 5,809,242 A | 9/1998 | Shaw et al. |
| 5,434,959 A | 7/1995 | Von Ehr, II et al. | | 5,812,736 A | 9/1998 | Anderson |
| 5,434,963 A | 7/1995 | Kuwamoto et al. | | 5,818,435 A | 10/1998 | Kozuka et al. |
| 5,434,978 A | 7/1995 | Dockter et al. | | 5,819,284 A | 10/1998 | Farber et al. |
| 5,438,355 A | 8/1995 | Palmer | | 5,826,102 A | 10/1998 | Escobar et al. |
| 5,440,262 A | 8/1995 | Lum et al. | | 5,870,768 A | 2/1999 | Hekmatpour |
| 5,442,771 A | 8/1995 | Filepp et al. | | 5,891,046 A | 4/1999 | Cyrus et al. |
| 5,446,919 A | 8/1995 | Wilkins | | 5,892,507 A | 4/1999 | Moorby et al. |
| 5,448,625 A | 9/1995 | Lederman | | 5,893,126 A | 4/1999 | Drews et al. |
| 5,455,826 A | 10/1995 | Ozveren et al. | | 5,898,432 A * | 4/1999 | Pinard ................. 715/861 |
| 5,457,305 A | 10/1995 | Akel et al. | | 5,913,040 A | 6/1999 | Rakavy et al. |
| 5,467,443 A | 11/1995 | Johnson et al. | | 5,917,486 A | 6/1999 | Rylander |
| 5,471,629 A | 11/1995 | Risch | | 5,923,365 A | 7/1999 | Tamir et al. |
| 5,473,143 A | 12/1995 | Vak et al. | | 5,933,137 A | 8/1999 | Anderson |
| 5,475,740 A | 12/1995 | Biggs, Jr. et al. | | 5,937,417 A | 8/1999 | Nielsen |
| 5,479,472 A | 12/1995 | Campana, Jr. et al. | | 5,940,080 A | 8/1999 | Ruehle et al. |
| 5,479,487 A | 12/1995 | Hammond | | 5,946,646 A | 8/1999 | Schena et al. |
| 5,483,466 A | 1/1996 | Kawahara et al. | | 5,963,191 A * | 10/1999 | Jaaskelainen, Jr. .......... 715/856 |
| 5,485,370 A | 1/1996 | Moss et al. | | 6,008,807 A * | 12/1999 | Bretschneider et al. ..... 715/732 |
| 5,488,609 A | 1/1996 | Hluchyj et al. | | 6,020,886 A | 2/2000 | Jacober et al. |
| 5,488,685 A * | 1/1996 | Palmer et al. ............... 715/708 | | 6,088,027 A | 7/2000 | Konar et al. |
| 5,491,820 A | 2/1996 | Belove et al. | | 6,100,871 A * | 8/2000 | Min ......................... 715/861 |
| 5,498,003 A | 3/1996 | Gechter | | 6,100,881 A * | 8/2000 | Gibbons et al. ......... 715/500.1 |
| 5,500,927 A | 3/1996 | Sander-Cederlof et al. | | 6,128,712 A | 10/2000 | Hunt et al. |
| 5,504,744 A | 4/1996 | Adams et al. | | 6,249,281 B1 | 6/2001 | Chen et al. |
| 5,511,160 A | 4/1996 | Robson | | 6,337,703 B1 | 1/2002 | Konar et al. |
| 5,513,991 A | 5/1996 | Reynolds et al. | | 6,373,490 B1 | 4/2002 | Bendiksen et al. |
| 5,515,098 A | 5/1996 | Carles | | 6,404,441 B1 | 6/2002 | Chailleux |
| 5,515,490 A | 5/1996 | Buchanan et al. | | 6,442,658 B1 | 8/2002 | Hunt et al. |
| 5,517,663 A | 5/1996 | Kahn | | 6,459,439 B1 | 10/2002 | Ahlquist, Jr. et al. |
| 5,526,413 A | 6/1996 | Cheston, III et al. | | 6,467,080 B1 | 10/2002 | Devine et al. |
| 5,528,490 A | 6/1996 | Hill | | 6,532,023 B1 * | 3/2003 | Schumacher et al. ....... 715/704 |
| 5,532,923 A | 7/1996 | Sone | | 6,558,431 B1 | 5/2003 | Lynch et al. |
| 5,537,586 A | 7/1996 | Amram et al. | | | | |
| 5,555,377 A | 9/1996 | Christensen et al. | | FOREIGN PATENT DOCUMENTS | | |
| 5,555,407 A | 9/1996 | Cloutier et al. | | EP | 0239884 A1 | 10/1987 |
| 5,557,721 A | 9/1996 | Fite et al. | | EP | 0325443 A2 | 7/1989 |
| 5,572,643 A | 11/1996 | Judson | | EP | 0342964 A2 | 11/1989 |
| 5,577,266 A | 11/1996 | Takahisa et al. | | EP | 0428261 A2 | 5/1991 |
| 5,579,537 A | 11/1996 | Takahisa | | EP | 0562995 A2 | 9/1993 |
| 5,583,563 A | 12/1996 | Wanderscheid et al. | | EP | 0733983 A2 | 9/1996 |
| 5,584,025 A | 12/1996 | Keithley et al. | | EP | 0749081 A1 | 12/1996 |
| 5,589,945 A | 12/1996 | Abecassis | | GB | 2034995 A | 6/1980 |
| 5,592,228 A | 1/1997 | Dachiku et al. | | GB | 2141907 A | 1/1985 |
| 5,592,602 A | 1/1997 | Edmunds et al. | | GB | 2185670 A | 7/1987 |
| 5,594,855 A | 1/1997 | Von Ehr, II et al. | | GB | 2207314 A | 1/1989 |
| 5,596,695 A | 1/1997 | Hamada et al. | | GB | 2256549 A | 12/1992 |
| 5,600,364 A | 2/1997 | Hendricks et al. | | GB | 2281434 A | 3/1995 |
| 5,600,366 A | 2/1997 | Schulman | | JP | 3204259 | 5/1991 |
| 5,602,982 A | 2/1997 | Judd et al. | | JP | 4250591 | 7/1992 |
| 5,604,542 A | 2/1997 | Dedrick | | JP | 6314184 | 8/1994 |
| 5,617,565 A | 4/1997 | Augenbraun et al. | | WO | WO 88/04507 A1 | 6/1988 |
| 5,623,593 A | 4/1997 | Spells, III | | WO | WO 90/07844 A1 | 7/1990 |
| 5,638,133 A | 6/1997 | Squire et al. | | WO | WO 92/08184 A1 | 5/1992 |
| 5,640,522 A | 6/1997 | Warrin | | WO | WO 92/12488 A1 | 7/1992 |
| 5,654,886 A | 8/1997 | Zereski, Jr. et al. | | WO | WO 93/09631 A1 | 5/1993 |
| 5,657,462 A | 8/1997 | Brouwer et al. | | WO | WO 93/19427 A1 | 9/1993 |
| 5,675,742 A | 10/1997 | Jain et al. | | WO | WO 95/31069 A1 | 11/1995 |
| 5,682,469 A | 10/1997 | Linnett et al. | | WO | WO 96/30864 A1 | 10/1996 |
| 5,687,331 A * | 11/1997 | Volk et al. ................. 715/840 | | | | |

| | | | |
|---|---|---|---|
| WO | WO 96/34466 A1 | 10/1996 | |
| WO | WO 96/36141 A1 | 11/1996 | |
| WO | WO 96/24213 A1 | 8/1998 | |

OTHER PUBLICATIONS

Macromedia; "Director 6 and Lingo Authorized"; cover page only.
Bricklin, Dan; "demo-it!-The Demo Builder for Windows"; cover page only.
Bricklin, Dan; "Demo II: Program User Manual"; section on overlays, pp. 49, 55-56.
Rist, Thomas et al.; "Adding Animated Presentation Agents to the Interface"; 1997, *ACM, Inc., IUI 97*, pp. 79-86.
"Creativity unlimited"; 1997, *Computer Shopper*, vol. 17, No. 5, p. 308.
"Creative interactive media"; 1997, Database Web Advisor, vol. 15, No. 12, pp. 64-67.
"Instant Replay records screen actions"; 1995, *MacWEEK*, vol. 9, No. 12, p. 20.
"All-purpose demo"; 1989, *PC/Computing*, vol. 2, No. 11, pp. 179-180.
"CaptureEze97-Application Techniques, screen capture software"; 1998, *PC/Computing*, vol. 11, No. 1, p. 278.
"Screen capture utilities"; 1994, *Windows Sources*, vol. 2, No. 5, pp. 146-149.
"How Multimedia Multitools Compare: NSTL tests four remarkable packages for creating mixed-media hits"; 1996, *Byte* pp. 122-126.
"Lights, Camera, Interaction"; 1997, *MacUser, Multimedia Authoring*, pp. 76-81.
"Authorware 4 gets Web savvy and easier to use: Macromedia tool acquires external media support"; 1997, *MacWeek*, pp. 11-12.
Von Schweber, Linda et al.; "Multimedia Authoring Tools-Sound, video animation: bringing together the diverse pieces of a dynamic multimedia event has never been easier"; 1996, *PC Magazine*, pp. 149-197.
Mendelson, Edward; "Collage Adds Utilities To Its Screen Capture"; 1993, *PC Magazine, First Looks-Image Capture*, p. 51.
Reichard, Kevin; "Lotus ScreenCam 2.0: Subtitled for Your Convenience", 1995, *PC Magazine*, p. 42.
Olsen, J.W.; "Screen Thief Steals Windows' Displays"; 1995, *PC Magazine*: First Looks, p. 49.
Rubenking, Neil J.; "Extending Your Apps: The Structure of a Help System"; 1994, *PC Magazine*, pp. 249-250 and 253-254.
Betmoney, Herb; "Learning long distance: The Labs evaluates seven vendors' solutions for delivering training via the Net"; 1997, PCWEEK, vol. 14, No. 35, pp. 1 and 22.
"Make your own Movies with ScreenCam"; 1995, *PC World*, pp. L32-L34.
Letter from Charles J. Kufas to Alexander Chailleux dated Jan. 22, 2004.
"Electronic Clipping Saves Time, Shows Results Fast"; *PR News*; Jan. 23, 1995; p. 3.
"Free E-mail Service Launched by FreeMark"; *Link Up*; Oct., 1995.
"Free E-Mail with Postage Stamp Ads"; *Newsbytes*; PNEW07030001; Jul. 3, 1995.
"Free Mail, Part Two, Two Companies Announce Free Internet E-Mail Services"; *Multimedia & Videodisc Monitor Information Access Company*; Aug. 1995.
"Freeloader, Inc. Announces The First Service To Deliver The Internet Offline"; *PR Newswire*; Jan. 19, 1996.
"Freemark Communications and Sportsticker Enter Online Sports Information Distribution Agreement; Popular Sports Content First of a Series of Innovative Content Offerings to be Delivered Free to Email Users" *Business Wire*; Jan. 30, 1996.
"FreeMark, Juno Online Plan to Offer Free Electronic Mail Accounts for those Prepared to Receive ADS with Mail"; *Computerprogram Int.*; Aug. 25, 1995.
"Getting Wired With St"; *Sunday Times*; Jan. 22, 1995.
"Individual Launches Newspage direct;"; *PR Newswire*; Feb. 9, 1996.
"Innovation That Has a Purpose is Called Key to Technology Success"; *Marketing News*; Mar. 14, 1988; pp. 37 & 40; vol. 22, No. 6.
"Internet E-mail; Juno signs up more than a million members; pioneering free internet e-mail service reaches 1,000,000 milestone"; *EDGE; Work-Group Computing Report*; Jan. 13, 1997; p. 39; vol. 8.
"Juno Enters Free-Mail Race"; *Electronic Marketplace Report*; Jul. 18, 1995; p. 4, vol. 9, No. 14.
"Juno Offers Free E-Mail with Advertising"; *Newsbytes*; PNEW7180013; Jul. 18, 1995.
"Lotus 1-2-3 for Windows with Multimedia SmartHelp"; *CD-Rom Professional*; May 1993; pp. 26-32; vol. 6, No. 3.
"Microsoft Cuts Deals with 2 Firms"; *San Jose Mercury News*; Dec. 12, 1996.
"Microsoft to Expand its Internet Reach"; *Los Angeles Times*; Dec. 12, 1996.
"News Alert to introduce real-time electronic clipping service"; *Information Today*; Jun. 1995; vol. 12, No. 6.
"No Free Lunch, But Free Internet E-Mail"; *Network Computing*; 1995; p. 22; No. 61.
"Non-Verbal Animated Help Screen Function"; *IBM Technical Disclosure Bulletin*; Jan. 1992; pp. 208-209; vol. 34, No. 8.
"Online Interactive's Free Shop Online Achieves One Million Electronic Orders—An Industry Milestone"; *Business Wire*; Feb. 7, 1996.
"OS/2: Contextual Animated-Open Window Control"; *IBM Technical Disclosure Bulletin*; Apr. 1992; pp. 68-69; vol. 34, No. 11.
"*PC Computing* MVP Winners and Finalists"; *PR Newswire*; Nov. 18, 1996.
"PC Meets TV: The Plot Thickens"; *Business Week*; Dec. 23, 1996; pp. 94-95.
"PointCast Network"; *Netguide*; Sep. 1996.
"Presenting Messages on an Object That is Not Currently Being Worked On"; *IBM Technical Disclosure Bulletin*; Nov. 1992; pp. 99-101; vol. 35, No. 6.
"The Elite 100: Leading the Digital Revolution"; *Upside*; Dec. 1996; entries 41-46.
"Their E-mail Could Become Free Mail"; *The Record*; Jul. 7, 1995.
"VCR Technology: No. 4 in a series of reports from Mitsubishi R&D"; *Video Review*; Jan. 1989.
"W3.COM Introduces First visitor-Tracking Software For Web Sites," *Business Wire*, Aug. 15, 1995.
"ZD Net Celebrates First Year of Web Advertising Program as Top-Grossing Content Provider with 63 April Advertisers"; *PR Newswire*; Apr. 15, 1996.
46 pages of email correspondence addressed to <junosys@deshaw.com>.
Abate, Tom; "Advertising Sponsorship is growing on the Internet"; *The Middletown Press*; Jul. 1, 1995.
Abate, Tom; "Major Deal to map Internet future"; *San Francisco Examiner*; Dec. 12, 1996.
Abrahms, Doug; "Patent Office May Hinder Hopping of Bunny Across Computer Screens"; *Washington Times*; Jun. 2, 1994; p. B7.
Alekperov, V. P. et al.; "An adaptation method for SDI"; *Nauchno-Tekh Inf. 2 (USSR), Nauchno-Teknicheskaya Informatsiva, Seriva 2*; 1973; Abstract only; USSR.
Alexander; "Visualizing cleared-off desktops"; *ComputerWorld*; May 6, 1991; p. 20.
Alsop, Stewart; "PointCast and Its Wannabes"; *Fortune*; Nov 25, 1996.
Andrews, Paul; "PointCast's 'push' method could be the next wave"; *The Seattle Times*; Dec. 1, 1996.
Apple Computer, Inc.; *Inside Macintosh QuickTime*; Jan. 1993; pp. 1-1 to 2-31.
Apple Computer, Inc.; *Macintosh Reference System 7*; pp. 30-31.
Baer, Ralph H.; "Tele-Briefs A Novel User-Selectable Real Time News Headline Service For Cable TV"; *IEEE Transactions on Consumer Electronics*; Jul. 1979; vol. CE-25, No. 3.
Bank, David; "Inverted Web: How Net is Becoming More Like Television to Draw Advertisers"; *The Wall Street Journal*; Dec. 13, 1996.
Bank, David; "Microsoft Picks On-Line News From PointCast"; *The Wall Street Journal*; Dec. 12, 1996.
Barrie et al., "The World Wide Web as an Instructional Tool"; *Science*; Oct. 18, 1996, pp. 371-372; vol. 274.

Bates, Mary Ellen; "Electronic Clipping Services: A New Life for SDIs"; *Online*; Jul. 1994; pp. 43-51; vol. 18, No. 4.

Bensch, U.; "VPV-Videotext Programs Videorecorder"; *IEEE*; 1988; pp. 788-792.

Berst, Jesse; "Push Products Redefine Internet"; *PC Week*; Nov. 25, 1996; p. 63.

Birman and Marzullo; "Isis and the Meta Project"; *SUn Technology*; Summer, 1989.

Birman, K., and T. Joseph; "Exploiting Virtual Synchrony in Distributed Systems"; *Proceedings of the Eleventh ACM Symposium on Operating System Principles*; Nov. 1987.

Bishop, Philip; "Gold Disk's Presentation App Astounds with Multimedia: Business Slide Show Program Adds Pizazz to Static Visuals"; *MacWEEK*; Jul. 5, 1993; p. 37; vol. 7, No. 27.

Borenstein, Nathaniel S.; "Multimedia Electronic Mail: Will the Dream Become a Reality?"; *Communications of the ACM*; Apr. 1991; pp. 117-119; vol. 34, No. 4.

Brethour, Patrick; "Microsoft Teams with PointCast"; *The Globe And Mail*, Dec. 12, 1996.

Buckler, Grant; "Juno Sues E-Mail Spammers For Fraud"; *Newsbytes News Network*; Nov. 24, 1997.

Bulterman et al., "A Structure for Transportable, Dynamic Multimedia Documents"; *USENIX*; Summer 1991; pp. 137-154; Nashville, TN.

Chan, Patrick P.; "Learning Considerations in User Interface Design: The Room Model"; publication of the *Software Portability Laboratory*; Jul. 1984; University of Waterloo, Waterloo, Ontario, Canada.

Chrein, Lloyd; "Top 25 Most Influential People On The Net"; *Inter@ctive Week*; Dec. 2, 1996; vol. 3, No. 28.

Christodoulakis, Stavros and Steven Graham; "Browsing Within Time-Driven Multimedia Documents"; publication of the *Institute for Computer Research*; Jul. 1988; University of Waterloo, Waterloo, Ontario, Canada.

Copperstock et al., "Why Use a Fishing Line When You Have a Net? An Adaptive Multicast Data Distribution Protocol"; *1996 Usenix Technical Conference*, Jan. 22-26, 1996, San Diego, CA; pp. 343-352.

Corcoran, Elizabeth, "The Marketers Are On-Lining Up for You; Interactive Ads, Other Gimmicks Kick Off the Internet's New Era," The Washington Post, Sep. 27, 1995.

Corel Corporation; *CorelDraw User's Manual-Version 4.0*; 1993.

Crowcroft et al.; "Some multimedia traffic characterisation and measurement results"; *Telecommunications, Fourth IEE Conference*; 1993; Abstract.

Crowther, G.O.; "Teletext and Viewdata Systems and Their Possible Extension to Europe and USA"; *IEEE Transactions On Consumer Electronics*; Jul. 1979; pp. 288-294; vol. CE25, No. 3.

Derringer, Pam; "Freemark Delays Release of Free E-Mail Until April"; *Mass High Tech*; Feb. 19, 1996.

Diaz, O., et al.; "Rule Management in Object Oriented Databases: A Uniform Approach"; *Proceedings of the Seventeenth International Conference on Very Large Databases*; Sep. 1991; Barcelona, Spain.

Dieberger, Andreas; "Browsing the WWW by Interacting with a Textual Virtual Environment-A Framework for Experimenting with Navigational Metaphors"; *Hypertext '96*, Washington, D.C., 1996; pp. 170-179.

Doyle, R. et al.; "Impact of Communication Delays and Deadline Times on Distributed Processing in Packet Radio Networks"; *IEEE, MILCOM '92*; 1992; pp. 0750-0756.

Finnie, Scot; "Look, Ma! No Browser"; *PC Magazine*; Jan. 7, 1997; p. 60.

Flynn, Mary Kathleen; "The Daily Me: Laying Out Tomorrow's (Electronic) News"; *PC Magazine*: Sep. 14, 1993; p. 29; vol. 12, No. 5.

Forsdick et al., "Initial Experience with Multimedia Documents in Diamond"; *Computer-Based Message Services*; 1984; pp. 99-113; H.T. Smith (Editor), Elsevier Science Publishers B.V., North-Holland.

Frook, John Evan; "News to the Desktop"; *Interactive Age*; Apr. 29, 1996.

Fryxell, David A.; "NewsNet Stands Alone"; *Link Up*; Nov. 1994; pp. 8-9; vol. 11, No. 6.

Funk Software, Inc.; *The Worksheet Utilities, 1st Ed.*; Jan. 1988; pp. 10-20, 48-60; Cambridge, Mass.

Gallagher, Suzanne E.; "Pressing Email's Mass-Market Advantage"; *D M News*; Nov. 27, 1995; Mill Hollow Corporation.

Gardner, Ricki; "Read all about the Prodigy® interactive personal service, the *only* service of its kind that lets each member of your family personalize it to his or her interests and priorities"; 1989; pp. 1-6.

Gecsel, J.; *The Architecture of Videotex Systems*; 1983, pp. 174-177; 233-238.

Goodman, D.; *The Complete HyperCard Handbook*; 1987; pp. 34-39; Bantam Books, Inc.

Grace, Rich; *Using PowerPoint 4 For Windows*; 1994; pp. 37-57, 274-275; QUE.

Gralla, Preston; "Shareware Shop"; *Computer Shopper*; Sep. 1993; p. 594; vol. 13, No. 9.

Hall, William; "Windows 3.0 Under the Spotlight"; *Computer Select 1989-1990, Doc. #21571, PC Magazine*; Sep. 11, 1990; p. 181 et. seq.; vol. 9, No. 15.

Harler, Curt, "Distribute Coupons Via E-Mail," R I S/Retail Info systems News, Jan. 1996.

Hauss, Deborah; "Technology Gives Early Warning of News Breaks"; *Public Relations Journal*; pp. 18-22; vol. 51, No. 1.

Hawkins, Donald T.; "Electronic Advertising on Online Information Systems"; *Online*; Mar. 1994; pp. 26-39; vol. 18, No. 2.

Hoffert et al.; "The Digital News System and EDUCOM: A Convergence of Interactive Computing, Newspapers, Television and High-Speed Networks"; *Communications of the ACM*; Apr. 1991; pp. 113-116; vol. 34, No. 4.

Huang et al.; "Multimedia E-mail: the Evolution Approach Based on Adaptors"; *Software-Practice and Experience*; Sep. 1994; pp. 785-800; vol. 24, No. 9.

International Business Machines; "Creation/Modification of the Audio Signal Processor Setup for a PC Audio Editior"; *IBM Technical Disclosure Bulletin* ; Mar. 1988; vol. 30, No. 10.

International Business Machines; "Improved Method for Help Lookups"; *IBM Technical Disclosure Bulletin*; Jun. 1986; pp. 281-292; vol. 29, No. 1.

International Business Machines; "Systems Application Architecture"; *Common User Access; Advanced Interface Design Guide, 1st Ed.*; Jun. 1989; pp. 89-91.

Ishii, Hiroshi and Kazuho Arita; "Clearface: Translucent Multiuser Interface of TeamWorkStation", *ECSCW*; Sep. 1991; pp. 6-10.

Ishii, Hiroshi and Naomi Miyaka; "Toward an Open Shared Workspace"; *Communications of the ACM*; Dec. 1991; pp. 37-50; vol. 34, No. 12.

Jackson et al.; "InterMail: A Prototype Hypermedia Mail System"; *Hypertext '91 Proceedings*; Dec. 1991, pp. 405-409.

Jaffee, Larry, "No Shortage of Online Choices," DM News, Mill Hollow Corporation, Feb. 6, 1995.

James, A.; "ORACLE-Broadcasting the Written Word"; *Wireless World*; Jul. 1973; pp. 314-316.

Lamont, Louise, et al.; "Synchronization of Multimedia Data For A Multimedia News-On-Demand Application"; *IEEE Journal On Selected Areas In Communications*; Jan. 1996; pp. 264-278; vol. 14, No. 1.

Lander, Richard; "Home Computer-From Your Own Correspondent"; *Independent*; Sep. 24, 1993; p. 15.

M2 Communications; "Productview Interactive To Launch Free EMAIL Service This Year"; *M2 Presswire*; Jun. 28, 1995.

Martin, J. *TCP/IP Networking*; 1994; pp. 147-148; PTR Prentice Hall.

*Mastering Windows 3.1 (Trademark of Sybex Inc)*; 1992; pp. xxxiv, 31-36, 67, 114-115 & pp. 1-10 of Microsoft Windows Tutorial.

McKenna, Patrick; "Freemark's Free Internet E-Mail Shuts Down"; *Newsbytes*; Dec. 6, 1996.

McKenzie, G.A.; "ORACLE-An Information Broadcasting Service Using Data Transmission in the Vertical Interval"; *Journal of the SMPTE*; Jan. 1974; pp. 6-10; vol. 83, No. 1.

Memon, Farhan, "Free E-Mail is here, but with ads aplenty," New York Post, Jul. 27, 1995.

Microsoft, Inc.; *Microsoft PowerPoint for Windows 95, Step by Step*; 1995; "Getting Ready," Lessons 1, 2, 12, and 13, Appendix B; Microsoft Press, Redmond, Washington.

Miller et al.; "News On-Demand for Multimedia Networks"; *ACM Multimedia*; vol. 93.

Miller, L. and A. Quilici; "A Knowledge-Based Approach to Encourage Reuse of Simulation and Modeling Programs"; *IEEE, Software Engineering and Knowledge Engineering, 1992 Conference*; Aug. 1992; pp. 158-163.

Miller, Michael J.; "Thirteenth Annual Technical Excellence Awards/Winner. The PointCast Network"; *PC Magazine Online*; Nov. 19, 1996.

Mitchell, Gabrielle; "Two Free Programs Deliver News to Your PC"; *PC World*; Aug. 1996, p. 76.

Mohan, Suruchi; "Firm to Offer Free 'Net Mail'"; *Computerworld*; Jul. 10, 1995.

Mohan, Suruchi; "Free Mail on the Internet"; *Computerworld*; May 27, 1995.

Mohan, Suruchi; "Free Mail on the net forces users to trade off privacy," Computerworld, Nov. 27, 1995.

Nelson, Andy; "PointCast 1-Server pleases all"; *Info World*; Nov. 18, 1996.

Nerney, Chris; "One million free E-mail subscribers can't be wrong"; *Network World*; Jan. 6, 1997; p. 25; vol. 14, No. 1.

O'Connor, Rory J., "Ads to pay for free e-mail service," Calgary Herald, Jun. 29, 1995.

O'Connor, Roy J., "Free e-mail Service Slated For The Fall; Limited Urban Areas To Try Out Advertiser-Supported Messaging Service," Austin American-Statesman, Jul. 1, 1995.

Overton, Richard; "PointCast 1.1: More Content for News Junkies"; *PC World*; Jan. 1997; p. 102.

Palmer, I. et al; "Realism: Reusable Elements for Animation Using Local Integrated Simulation Models"; *IEEE, Computer Animation, 1994 Proceedings*; Sep. 1994; pp. 132-140.

PCT International Search Report for PCT International Application No. PCT/US94/00919.

PCT International Search Report for PCT International Application No PCT/US94/00912.

PED Software Corporation; *Journalist, TM, User's Guide, Your Personalized Newspaper for CompuServe*; 1994; pp. 1-143; Cupertino, CA, U.S.A.

Phillips, Richard L.; "An Interpersonal Multimedia Visualization System"; *IEEE Computer Graphics & Applications*; May 1991; pp. 20-27.

Phillips, Richard L.; "MediaView: A General Multimedia Digital Publication System", Communications of the ACM, vol. 34, No. 7, Jul. 1991, pp. 75-83.

Pizzo, Stephen, "On-Line Mortgage Service Will Operate Over Internet," National Mortgages News, Oct. 31, 1994.

Postel et al., "The ISI Experimental Multimedia Mail System"; *ISI Research Report, ISI/RR-86-173*; Sep. 1986.

Proffit, Brian; "Intercast Brings the Web to TV"; *PC Tech/Internet Tools, PC Magazine*; Jan. 21, 1997.

Quain, John R.; "Journalist Delivers Your Own Personalized Newspaper"; *PC Magazine*; Oct. 12, 1993; p. 49; vol. 12. No. 17.

Ramanathan et al.; "Architectures for Personalized Multimedia"; *IEEE Multimedia*; Spring 1994; pp. 37-46.

Ramanathan et al.; "Towards Personalized Multimedia Dial-up Services"; *Computer Networks and ISDN Systems*; 1994, pp. 1305-1322; Elsevier Science B. V.

Rapoza, Jim; "I-Server: Gotta have it"; *PCWeek*; Oct. 28, 1996.

Rigdon, J.; "Coming Soon to the Internet: Tools to Add Glitz to the Web's Offerings"; *Wall Street Journal*; Aug. 15, 1995.

Risch, Tore; "Monitoring Databases Objects"; *Proceedings of the Fifteenth International Conference on Very Large Data Bases*; Aug. 1989; pp. 445-453.

Robinson, G., et al.; "Touch-Tone Teletext,' A Combined Teletext-Viewdata System"; *IEEE Transactions on Consumer Electronics*; Jul. 1979; pp. 299-303; vol. CE25, No. 3.

Roizen, J.; "Teletext in the USA"; *Journal of the SMPTE*; Jul. 1981; pp. 602-610.

Schoenfeld, Adam et al., "Developers Plan Free E-Mail," Online Marketplace, Jun. 1995.

Schroeder, Birrell and Needham; "Experiences with Grapevine: The Growth of a Distributed System"; *ACM Trans. on Computer Systems*; Feb. 1984; pp. 3-23; vol. 2, No. 1.

Seno, Hiroshi et al.; Multimedia information broadcasting service '*PRESENT*': Vehicle Navigation & Information Systems; 1994.

Singh, Amarendra; "A New Generation of NNTP Servers Provides a Vehicle for Enhanced Collaboration"; *PC Magazine*; Jan. 21, 1997; pp. 183-190.

Soltes, Fiona; "Hanging 10 on the Internet Not As Costly As You Might Think"; *The Tennessean*; Aug. 16, 1995.

Sparacino et al.; "Media actors: characters in search of an author"; *MultiMedia Computing and Systems, IEEE International Conference*; Jun. 1999; Abstract.

Steinberg, Don; "Making Meaningful Connections" *PC Magazine*; Feb. 23, 1993; p. 303; vol. 12, No. 4.

Story et al.; The RightPages, Image-Based Electronic Library for Alerting and Browsing; *Computer*; Sep. 1992; pp. 17-26.

Swartz, Jean; "Microsoft Unites With PointCast at Trade Show"; *The San Francisco Chronicle*; Dec. 12, 1996.

Tadjer, Rivka; "Two Services Change E-Mail to Free Mail"; *Computer Shopper*; Sep. 1995; p. 65; vol. 15, No. 9.

Thimm, Helko; "A Multimedia Enchanced CSCW Teleservice for Wide Are Cooperative Authoring of Multimedia Documents"; *SIGOIS Bulletin*; Dec. 1994, pp. 49-57; vol. 15, No. 2.

Ueda, Hirotada et al.; "Impact: An Interactive Natural-Motion-Picture Dedicated Multimedia Authoring System"; Central Research Laboratory, Hitachi, Ltd.; 1991.

Van Kirk, Doug: "Lotus Notes tied to Internet"; *Infoworld*; p. 49; vol. 16, No. 41.

Vaughan-Nichols, Steven J.; "Connect Time"; *Computer Shopper*; Apr. 1993; p. 670; vol. 13, No. 4.

Vonder Haar, Steven; "Young Turks Point The Way Offline"; *Interactive Week*; Oct. 14, 1996.

Wilder, Clinton, "Get News While Your PC Sleeps," Online Magazine, Feb. 26, 1996, p. 77.

Wilder, Clinton; "Free E-mail—For a Price"; *Information Week*; Nov. 27, 1995.

Williamson, Debra Aho; "This e-mail message is brought to you by . . . "; *Advertising Age*; Apr. 17, 1995.

Wingfield, Nick, "Juno Offers free E-mail service to end-users," Infoworld, Jul. 10, 1995.

WordPerfect Corp.; 28 pages of screen images of WordPerfect. RTM. for Windows, Version 5.1; Apr. 1992.

Yan et al.; "SIFT-A Tool for Wide-Area Information Dissemination"; *1995 USENIX Technical Conference*, Jan. 16-20, 1995; pp. 177-186; New Orleans, LA.

Zuckerman, Laurence; "Microsoft And PointCast in Broadcast Alliance"; *The New York Times*; Dec. 12, 1996.

Zuckerman, Laurence; "Pushing the Envelope on Delivery of Customized Internet"; *New York Times*; Dec. 9, 1996; Section D5.

"A Need-To-Know Basis"; WebMaster; Oct. 1996.

"Journalist-A New Prodigy Add-On"; Newsbytes News Network; Apr. 5, 1994.

"Monitoring Corporate Information With FirstFloor Products"; World Wide Web; Nov. 30, 1996.

"PED Delivers Personalized Newspapers to Users Desktops"; Electronic Information Report; Apr. 15, 1994; vol. 15, No. 14.

Avalos, George; "PointCast to Team with Microsoft, Add New Net dimension"; Contra Costa Times; Dec. 12, 1996.

Bean, Joanna; "Colorado-Based Startup Uses Computer Screen Savers for Marketing"; The Gazette Telegraph; Feb. 22, 1994.

Buckler, Grant; "And Now The News-On Your PC Screen"; Newsbytes News Network; Oct. 16, 1995.

Buckler, Grant; "Globe Information To Market NewsEdge in Canada"; Newsbytes News Network; May 26, 1992.

CCITT Standard X.208.

CCITT Standard X.209.

CompuServe Brochure; pp. 1-4; Cupertino, CA, U.S.A.

Dumoulin, James M.; "Better Internet Access With WinVN"; AeroSpace Technology Innovation; p. 14.

Elliott, Christopher; "Big Business at Businesswire.Com"; Web Techniques; Dec. 1996, pp. 95-99.

Green, N. W.; "ORACLE-The Problems of Implementing a Teletext System On Independent Television and Their Solution"; Colloquim on Broadcast and Wired Teletext Systems--Ceefax, ORACLE, ViewData Organized by Professiona Group E14 Digest No. 197613; Jan. 13, 1976.

Inglesby, Tom; "Rightsizing the Enterprise"; Manufacturing Systems Supplement; Oct. 1992; pp. 6-10.

International Business Machines; IBM Technical Disclosure Bulletin; Oct. 1985; vol. 28, No. 5.

Intertect. Ltd.; Hyper Texxt Newzzz; Mar. 1996; pp. 1-20; Philadelphia, Pennsylvania, U.S.A.

Isis Documentation: Release 1; Jul. 1987.

Kass, Andrew Jonathan; An Interchange Standard and System for Browsing Digital Documents, M.I.T.; May 1995; pp. 1-105; U.S.A.

O'Connell, G. M.; "Turning On to Screen Savers"; Promo; Jun. 1994; p. 97.

PED Software Corporation; Journalist Quick Start; pp. 1-4; U.S.A.

Prodigy Interactive Personal Service: "Journalist for a Window on a New World of News"; pp. 1-4; Cupertino, CA, U.S.A.

Prodigy Services Company; "Prodigy"; 1989.

Schneider, Fred B.; "Affidavit in Support of Lead Case Plaintiff's Motion for Partial Summary Judgment"; Nov. 4, 1993.

System as described in Cable Data ad.

System as described in DIP II ad.

The ISIS System Manual; Mar. 15, 1988.

Viewdata; Chapter 10; pp. 112-123.

Williams, Martyn; "Oracle's Vision of Networked Future"; Newsbytes News Network; Oct. 5, 1995.

Apple Computer, Inc.; HyperCard.RTM, Basics Manual and 3.5" Diskette containing HyperCard.RTM. Program Version 2.1; 1991.

Microsoft, Inc.; Seven pages of screen images of Microsoft Windows Program Manager, Version 3.1; 1992.

Delta Point, Inc.; Delta Graph Professional, For Macintosh; 1989; Chapter 13; Monterey, California.

IEEE; "Consumer Electronics"; Digest of Technical Papers; 1992; Abstract.

Koenen, Rob; International Organisation for Standardization, Coding of Moving Pictures and Audio, ISO/IEC JTC1/SC29/WG11 N1909; Oct. 1997.

Yamada, Ken; "Developers Eye Online Registration Options"; Computer Reseller News; Jun. 5, 1995; p. 2.

Dazzler Deluxe 3.1 User Guide. 1996, Intelamedia Ltd., pp. 1-132.

Corel Presentations 7, Corel Corporation 1995, "Basic Slide Shows", pp. 152-206.

Corel Presentations 7, Corel Corporation 1995, "Appendix"; pp. 208-238.

Snailt's History; 2005, www.techsmith.com/products/snagit/history.asp, 16 pages.

* cited by examiner

SYSTEM FOR CREATING MEDIA PRESENTATIONS OF COMPUTER SOFTWARE APPLICATION PROGRAMS

CROSS-REFERENCES TO RELATED APPLICATIONS

The present application is a divisional application of U.S. patent application Ser. No. 10/121,117, filed Apr. 10, 2002 now abandoned, entitled "SYSTEM FOR INCLUDING ADVERTISING IN A PRESENTATION OF INFORMATION", which in turn is a divisional application of U.S. patent application Ser. No. 09/357,556, filed Jul. 16, 1999, entitled "SYSTEM FOR CREATING MEDIA PRESENTATIONS OF COMPUTER SOFTWARE APPLICATION PROGRAMS", now U.S. Pat. No. 6,404,441, the disclosures of which are incorporated by reference herein.

COPYRIGHT NOTICE

A portion of the disclosure recited in the specification contains material which is subject to copyright protection. Specifically, a Microfiche Appendix in accordance with 37 CFR Section 1.96 is included that lists source code instructions for a process by which the present invention is practiced in a computer system. The Microfiche Appendix comprises 13 sheets of microfiche containing 1180 frames, or pages, of source code. The copyright owner has no objection to the facsimile reproduction of the specification as filed in the Patent and Trademark Office. Otherwise all copyright rights are reserved.

BACKGROUND OF THE INVENTION

This invention relates in general to computer software and, more specifically, to a system that allows the creation of a demonstration presentation of computer software, or other computer information.

Today, computer software application programs are an important, and prevalent, product. Computer software is used in virtually every facet of our lives including business, commerce, education and entertainment. Software has proven to be very popular and effective in performing in a wide variety of applications.

However, as computing resources and power have increased, so has the size and complexity of software programs. In order to allow human users to effectively operate these more complex application programs, sophisticated graphical user interfaces (GUIs) have been developed. Naturally, this increased complexity and sophistication requires that a new user spend considerable time learning, or being trained in, the operation of the software. Traditionally, such training has occurred on a person-to-person basis. As, for example, where an instructor and trainees meet face-to-face in a classroom. The use of written manuals, prerecorded videotapes, audiotapes, etc. are also an aid to new users' understanding of software applications. However, these traditional approaches to training in computer programs leaves something to be desired.

For example, considerable time and effort is required in instructor training and preparation; writing, publishing and maintaining effective references (either electronic or hard copy); producing a video or audiotape, etc. Also, these traditional approaches tend to be insufficient to support a new user's ongoing need for instruction in the software application. This is particularly true where, as with today's software, a user is constantly exposed to new features in the program, or needs to know of a new feature, and thus requires immediate instruction. Often manuals are unwieldy and difficult to index and access. Other media, such as video and audiotape, does not provide an effective means for obtaining the training information. Further, these traditional methods are not convenient for a user to access while the user is operating the application program and is suddenly struck with a problem or faced with a question.

Although "on-line help" forms of information have become popular, on-line help has much of the same characteristics as traditional manuals, providing only slight advantages over hard copy manuals by allowing searches. Although electronic on-line help is immediately accessible at a user's computer, the online help tends to be "static," in that the electronic manuals mimic a hardcopy presentation of information in the form of pages of text along with illustrations.

A problem with on-line help, or electronic manuals, is that reference to the complex user interface controls and displays is purely by way of text. Often a user is directed through many steps in a confusing way. For example, a user may be asked to "open Window B, click on button X, pull down menu Y, highlight item Z, and enter a number into the resulting dialog box." At each of the steps in the previous instruction, the user's display may change as the user operates the GUI so that the user must hunt for the next item to be selected, or activated. This can be confusing to the user as the user attempts to correlate a text description with visual controls that are spread out over the screen and may reappear, disappear or change. At any step in the way, the user is prone to making a mistake and heading down the wrong path. The user may not realize that they have taken the wrong path until a few steps have passed. In this case the user is unaware of exactly where the wrong step was taken.

Electronic manuals often include "screen shots," or still pictures of the user interface, which are included adjacent to text in the electronic manual. While this helps improve a user's understanding of how to operate the user interface, it is still a static representation of the user interface that requires association of text in separate paragraphs to the image being presented. In such static presentation the user fails to get a feel for how the user interface is actually being operated. Also, it is not trivial for an author to compile such a manual by writing text, obtaining screen shots, inserting the screen shots into the text, correlating the screen shots to the text, etc.

Thus, it desirable to provide a product that allows an author to easily create presentations that are dynamic, and effective, in presenting information, such as the operation of a computer application program.

The rise in popularity of the Internet as a distribution and commerce medium for software and other digital information has also given rise to a greater need for effective presentation of information. One such need is the need to demonstrate the features, aspects and functionality of computer software to potential users, or purchasers. This is necessitated by the Internet since, unlike walking into a store and speaking with a salesman, purchasers over the Internet may have to make a buying decision without being able to operate a fully functional version of the software. Another use for such presentations is to assist users in running their current application programs, operating systems, utilities, etc. Again, because of the complexity in the application programs, and their GUIs, the need for a detailed, and precise, presentation of the steps, and operation, of the software is of vital importance.

Thus, it is desirable to provide a product that allows the creation of effective and efficient presentation of application programs, operating systems, utilities, and other computer information in a simple way. It is desirable for the resulting presentation to be compact and viewable without specialized programs. This is especially true where such presentations may be transferred over, downloaded, or otherwise obtained from networks of restricted bandwidth, such as the Internet.

Another recently emerging aspect of software in general, and of the Internet in particular, is advertising. Ads designed to sell products or services is a fast-growing aspect of electronic commerce (E-commerce). Typically, such ads take the form of "banners" on Web pages which are viewable when a user is on-line and viewing a Web page that includes a banner ad.

Another aspect of Internet e-commerce is in the method of distribution, marketing and sale of computer software. Such approaches as "shareware," "demoware," "trialware," etc., are designed to allow users to experience a software product before purchasing the product. Typically, these approaches allow a user to operate a software product for a limited amount of time, or allow a user to operate a software product that has less than the full feature set. However, users will often use the product through the free trial period and then not purchase the product. Additionally, some users may continuously download new copies of the time-limited product so that they can continue using the product without paying. Still another problem is that such time restrictions are relatively easy to defeat for "hackers" who might modify the software, system timer, operating system, etc. Similarly, in the approach where some features of the software product are disabled, users may continue to use the software without being hampered too much by the disabled features. This allows a user to essentially use the software for free, indefinitely. Also, this type of software is still susceptible to hacking.

Thus, it is desirable to provide a revenue model for software manufacturers whereby users can obtain use of software while the manufacturer is assured of some revenue return.

SUMMARY OF THE INVENTION

The present invention provides a system for easily producing presentations of computer application programs. The system also provides for including advertising information in the produced presentations when an unpaid-for version of the system's software is being used. When the presentation is viewed online, the ads can be updated by a central ad server. This allows different ads to be inserted into the presentation, tailoring ads to the viewer, etc. When the presentation is viewed offline, default ads are kept in the presentation.

The system provides authoring software for creating a sequence of screenshot images of an application program to be presented. Each screenshot is a slide in the presentation and is displayed for an interval of time during playback of the presentation. The authoring software also allows an author to control cursor movement animation to be played back during the presentation. Text description in the form of "bubble text," "memo text," "questions," etc. can be specified along with the position, size and other properties of the text. Various controls are provided for selection, editing, arrangement of the slides. Characteristics such as cursor shape, speed of movement, starting and ending positions, alignment, etc. can be set by the author.

The author can specify a "click area" in association with a question, or prompt, to the viewer of the presentation. This allows the presentation to ask the viewer to click on a button or control on a slide and to detect whether the viewer has complied. In response, additional feedback can be provided to the viewer as to whether the proper action was performed or not.

After an author completes a sequence, the sequence is compressed into a small self-contained package. In a preferred embodiment, the package includes two files that can be played back without any dedicated engine or specialized application that could require a separate download. A typical user with a web browser can quickly obtain a presentation from the Internet and play back the presentation instantly.

In one embodiment the invention provides a method for using a computer system to create a presentation of subject matter. The method includes generating a first screen display of the subject matter; storing at least a portion of the first screen display along with the cursor position at the time of storing; generating a second screen display of the subject matter; storing at least a portion of the second screen display along with the cursor position at the time of storing; displaying the stored portion of the first screen display along with a display of both cursor positions; and accepting signals from the user input device to allow manipulation of the cursor position to specify cursor animation during playback of the presentation.

Another aspect of the invention provides a system for including advertising in a presentation of information on a computer. The system provides for using an authoring program to generate a presentation for playback on a computer system; inserting a link to an advertisement source into the presentation; and displaying an advertisement obtained from the advertisement source during playback of the presentation.

DETAILED DESCRIPTION OF SPECIFIC EMBODIMENTS

The present invention includes several aspects. An authoring program is used by an author to create a presentation. The subject of the presentation is typically an application program but can, in general, be any information displayed on a computer. The authoring program uses screenshots of the information as the basis for creating a presentation, or "sequence," of the information. The author can add cursor movements, text, user interaction, and can control the sequence. A human viewer, or user, plays back the presentation at a later time. The presentation is a self-contained file or set of files that is compacted for efficient transport, download and storage. The files are decompressed prior to playback. One version of the authoring program inserts advertising information into the presentation so that the advertisement is visible to a viewer during playback of the presentation.

A preferred embodiment of the present invention is the authoring program called "Leelou," manufactured by J.E.T. Software. The source code for Leelou is provided with this application in the source code Appendix. The Appendix should be consulted for details about the invention. The source code Appendix includes code for an authoring program and player. The authoring tool uses Java 1.1.6+ virtual machine and the player uses the browser's Java 1.1.5+. The authoring tool also contains a small amount of C code for the screen capture.

Additionally, a hardcopy appendix has been included in U.S. patent application Ser. No. 10/121,117, filed Apr. 10, 2002, entitled "SYSTEM FOR INCLUDING ADVERTISING IN A PRESENTATION OF INFORMATION" which is incorporated herein. The hardcopy appendix describes the application programming interface (API) for the Leelou product and the class hierarchy of the objects used in the program.

The invention is presented below and is discussed in connection with the Figures. First, an overview of the inventions is presented. Next, standard hardware appropriate for use with the present invention is described. Next, features of the Leelou authoring software are discussed. Finally, the approach of using advertisements in certain of the finished presentations is set forth.

Overview of the Invention

Figure 1:
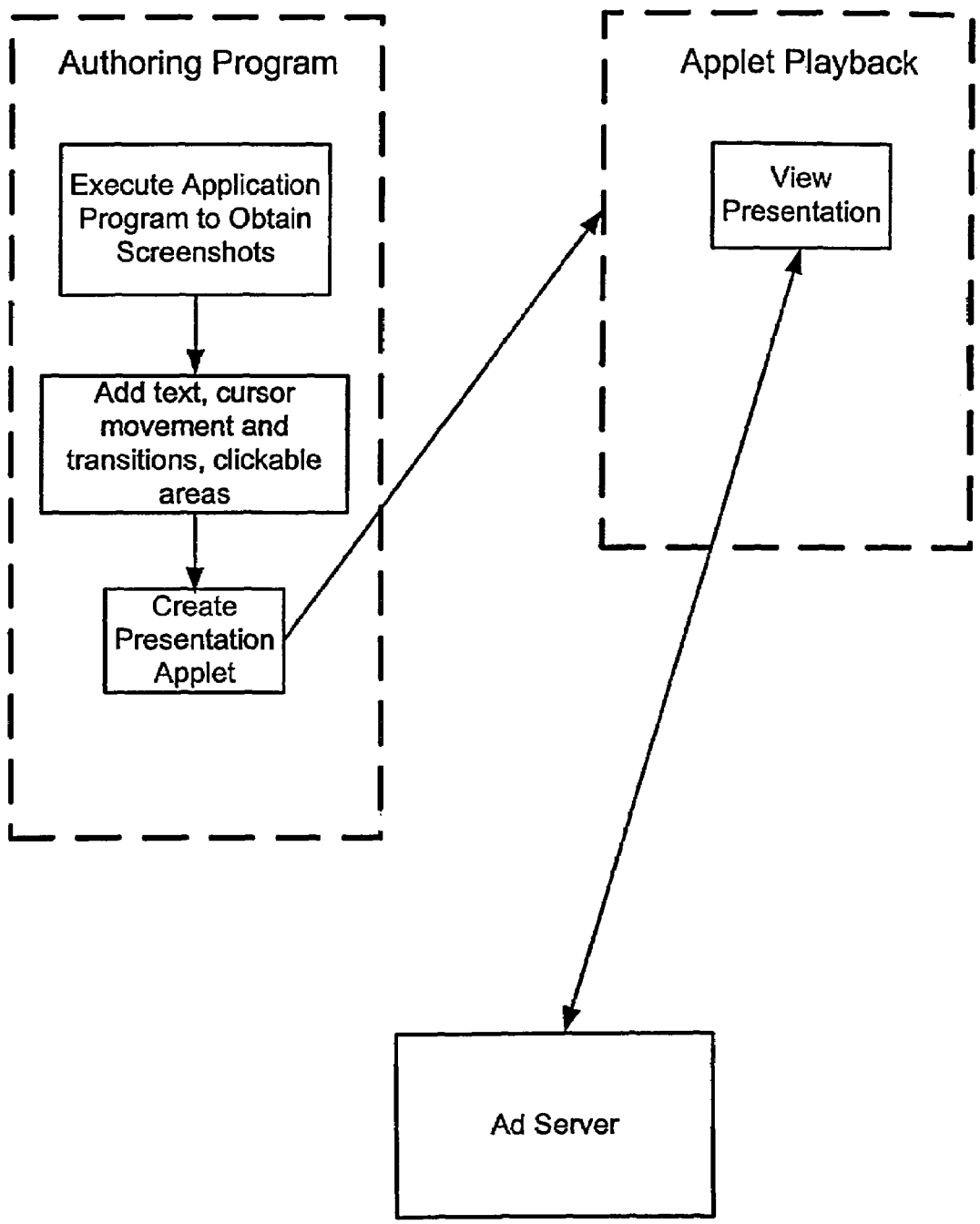
FIG. 1 illustrates the basic approach of the invention.

FIG. 1 illustrates the basic approach of the invention. In FIG. 1, the invention provides an authoring program, Leelou, for use by an author to create a sequence of slides along with animations, text and other features for playback at a later time. This is referred to as a presentation that is viewed by a user, or viewer. The authoring program includes basic steps of having the author create screenshots, or slides of an application program, or other information. After screenshots are obtained, the author can further manipulate the screenshots to put them into sequence for a presentation.

The author adds cursor movement, cursor transitions, descriptive text, interactive clickable areas and other features, explained in detail, below. The author finalizes the presentation as a Java applet that can be viewed with a web browser. The applet is provided to an end user for playback. The applet is self-contained and can be viewed in a Java-enabled browser without the need for downloading additional executables, plug-ins, etc.

A user can download and view the applet at any time. Sequence controls, similar to videocassette recorder controls, are provided to facilitate playback of the presentation. An added aspect of the invention allows presentations to include advertising. In one mode of advertising, an advertisement can be controlled by an ad server over the Internet. This allows a high-degree of customization and updating of advertisements.

Description of Hardware

Figure 2A:
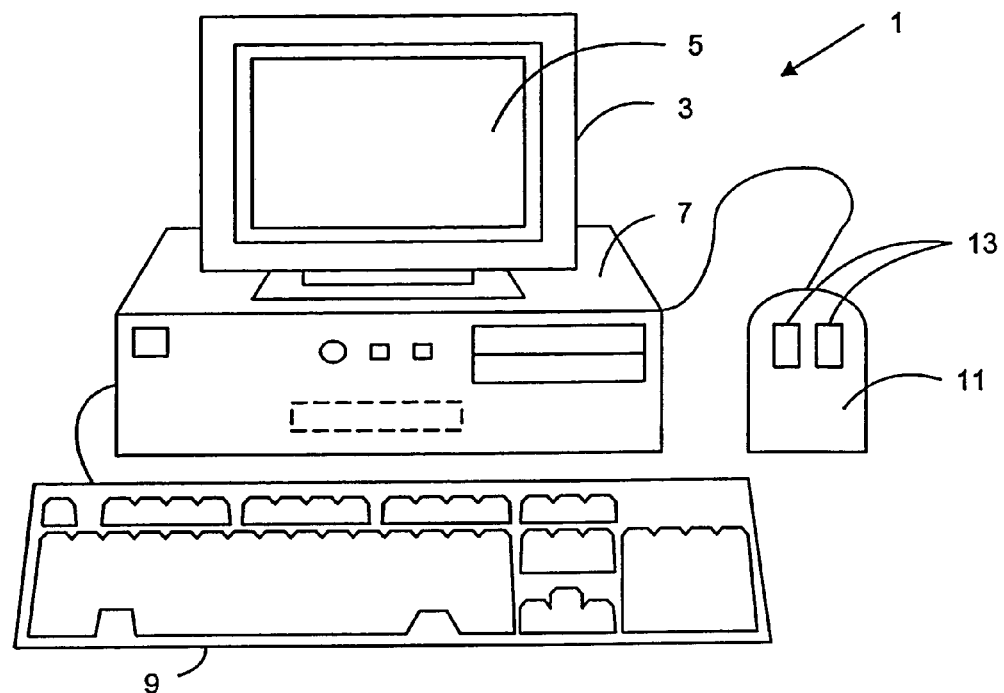
FIG. 2A is an illustration of computer system suitable for use with the present invention.

FIG. 2A is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

Figure 2B:
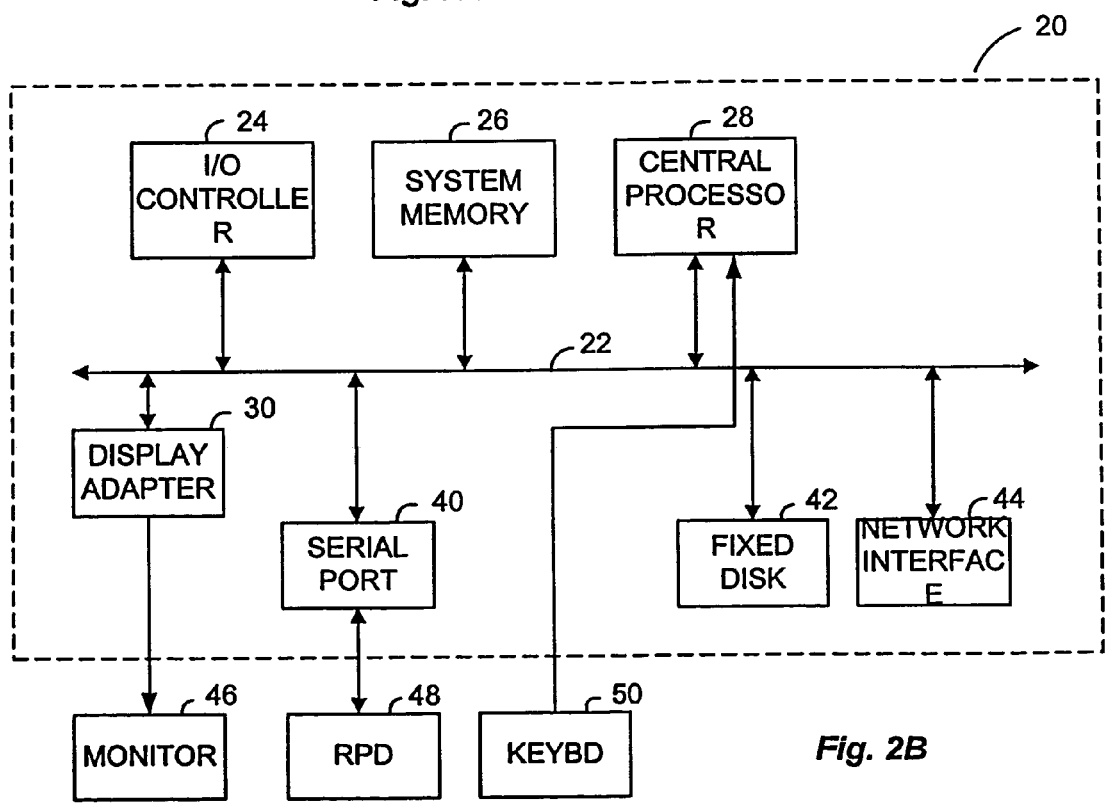
FIG. 2B shows subsystems in the computer system of FIG. 2A.

FIG. 2B illustrates subsystems that might typically be found in a computer such as computer 100. In FIG. 2, subsystems within box 20 are directly interfaced to internal bus 22. Such subsystems typically are contained within the computer system such as within cabinet 7 of FIG. 2A. Subsystems include input/output (I/O) controller 24, System Random Access Memory (RAM) 26, Central Processing Unit (CPU) 28, Display Adapter 30, Serial Port 40, Fixed Disk 42 and Network Interface Adapter 44. The use of bus 22 allows each of the subsystems to transfer data among the subsystems and, most importantly, with the CPU. External devices can communicate with the CPU or other subsystems via bus 22 by interfacing with a subsystem on the bus. Monitor 46 connects to the bus through Display Adapter 30. A relative pointing device (RPD) 48 such as a mouse connects through Serial Port 40. Some devices such as Keyboard 50 can communicate with the CPU by direct means without using the main data bus as, for example, via an interrupt controller and associated registers (not shown).

As with the external physical configuration shown in FIG. 2A, many subsystem configurations are possible. FIG. 2B is illustrative of but one suitable configuration. Subsystems, components or devices other than those shown in FIG. 2B can be added. A suitable computer system can be achieved without using all of the subsystems shown in FIG. 2. For example, a standalone computer need not be coupled to a network so Network Interface 44 would not be required. Other subsystems such as a CDROM drive, graphics accelerator, etc. can be included in the configuration without affecting the performance of the system of the present invention.

Figure 2C:
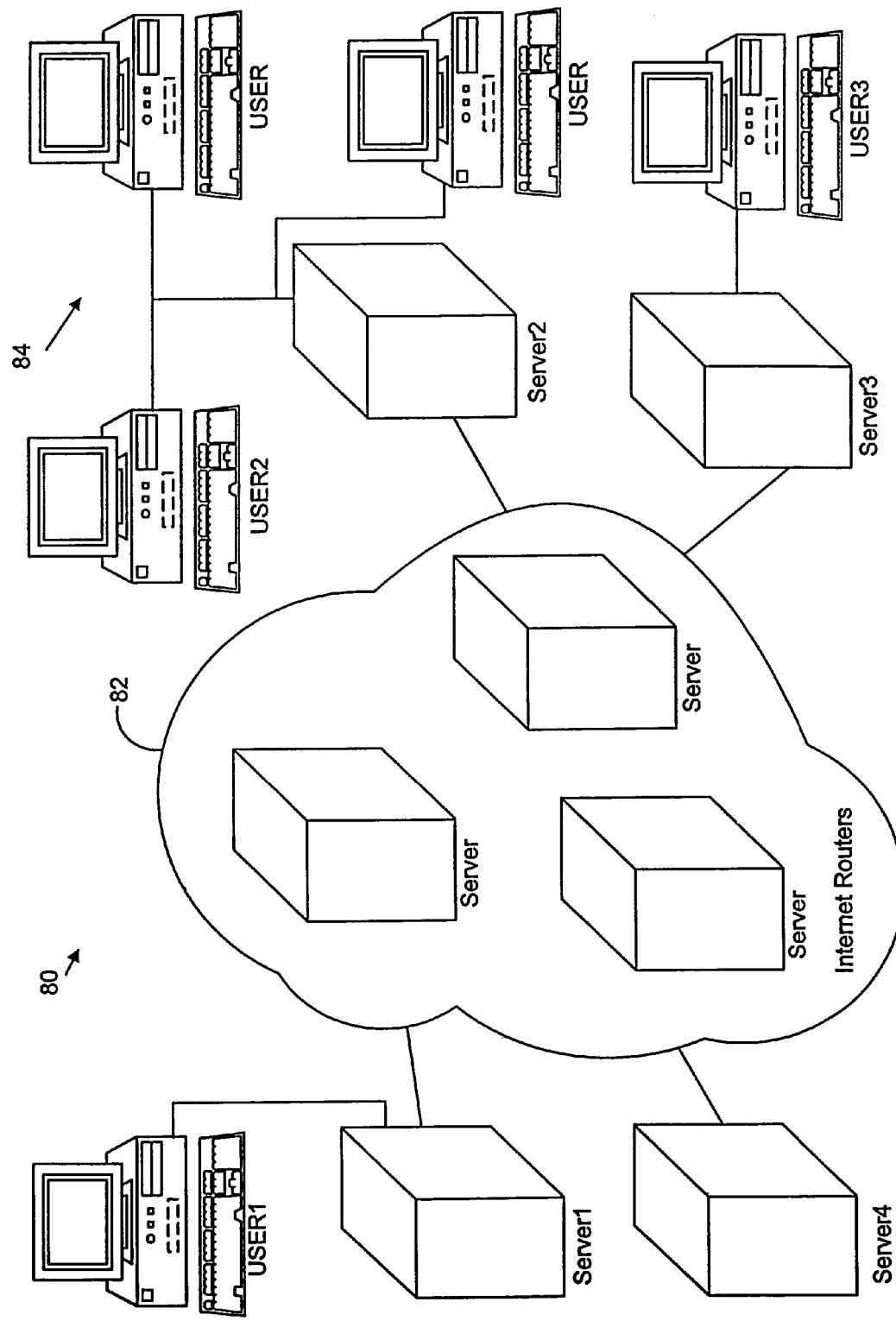
FIG. 2C is a generalized diagram of a typical network.

FIG. 2C is a generalized diagram of a typical network. In FIG. 2C, the network system 80 includes several local networks coupled to the Internet. Although specific network protocols, physical layers, topologies, and other network properties are presented herein, the present invention is suitable for use with any network.

In FIG. 2C, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 82. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line.

Similarly, other computers at 84 are shown utilizing a local network at a different location from USER1 computer. The computers at 84 are coupled to the Internet via Server2. USER3 and Server3 represent yet a third installation.

Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention, may be presented as a single entity, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction.

Creation of a Presentation Sequence

A first step in creating a presentation sequence of an application is to create, or "open" a new file that has the name of the presentation. In the preferred embodiment, sequence, or presentation, files have the extension ".leelou". The file name is used to identify all files associated with playing back the named sequence, or presentation.

The basis of the sequence is a series of screen shots, or displays, that are selected for presentation to a viewer of the sequence. The Leelou program allows a human operator to select screen shots, designate cursor movements, define "bubble" text, etc., in order to create a sequence. Other embodiments may automate the process where, for example, another computer program automatically performs one or more of the authoring steps described herein.

In order to obtain screen shots the author simply executes the software application that is to be the subject of the sequence. It is assumed that the software application generates displays. In the Leelou product, screenshots are captured during the application's execution when the author depress a keyboard key, such as the "pause" key.

Next, the author selects a screen resolution for the screenshots. For example, common resolutions are 640×480, 800×600 and 1024×768. Note that the step of setting a resolution is necessitated by the specifics of today's operating systems, display hardware, drivers, etc. In the future, this step may not be necessary or, if necessary, can be automated so that it is not performed by the author.

The screen resolution is selected to be a lower resolution than the resolution at which the sequence will ultimately be replayed, or viewed. Screenshots taken at a selected resolution need to be viewed at a higher resolution in order for the operating system's window that displays the screenshot to be fully usable. The window, and this resolution requirement, are a result of using traditional operating systems, such as Microsoft's Windows operation systems, to later display the screen shots in a way that is familiar to users of computer systems. Different operating systems may not require displaying the sequence at a higher resolution than that at which the screenshots were captured. In the preferred embodiment, however, since a screenshot can occupy the entirety of the display screen, and since the screenshot will be displayed within a window which has peripheral controls such as a maximize/minimize button, title bar, etc.; the combination of the window and screenshot needs to be viewed at a higher resolution than that at which the screenshot was initially captured.

Figure 3:
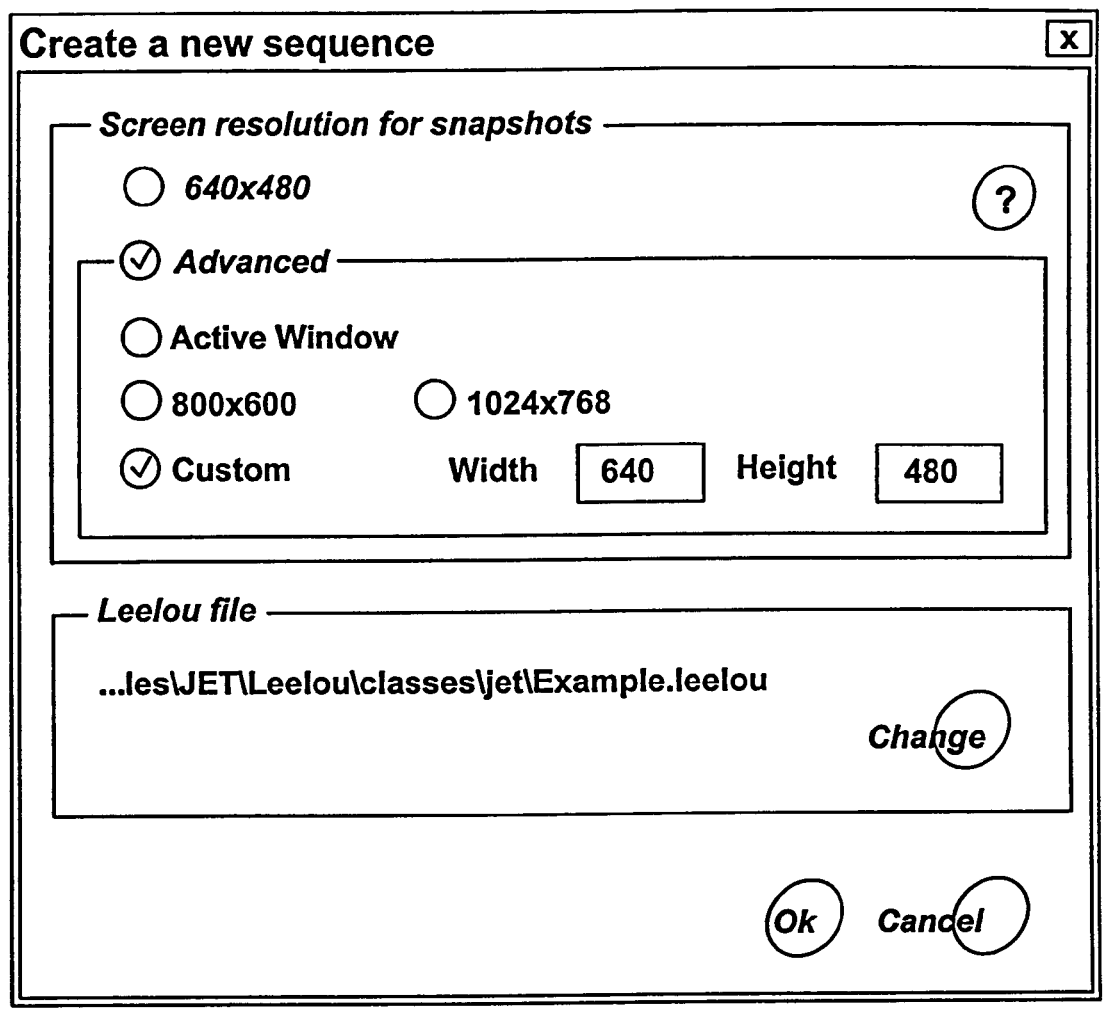
FIG. 3 is a first screen display to illustrate the operation of the invention.
Figure 4:
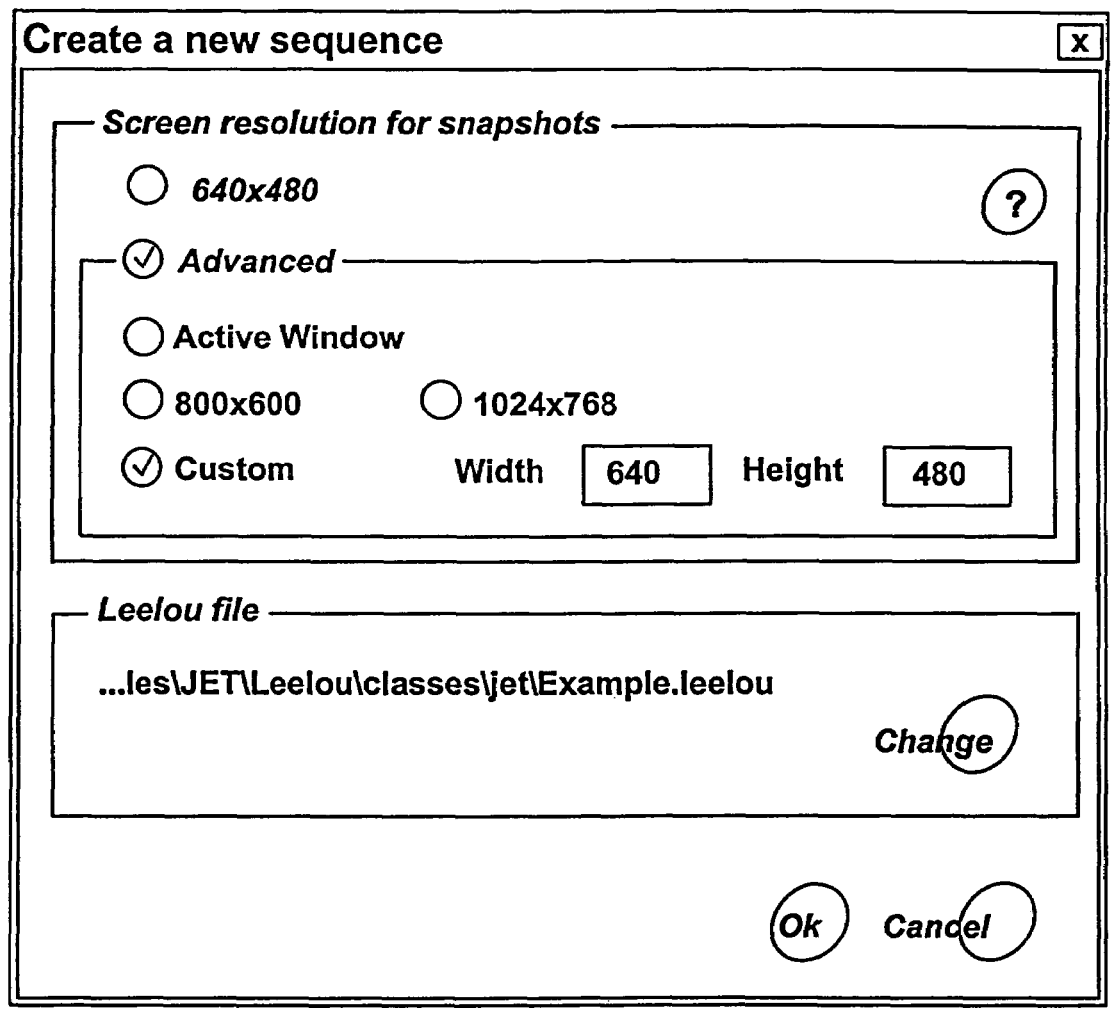
FIG. 4 is a next screen display to illustrate the operation of the invention.

FIG. 3 shows the dialogue box used in Leelou to allow the sequence author to select a resolution. Predefined resolutions of 640×480, 800×600 and 1024×768 are possible. Alternatively, a custom size can be selected. Also, the author can decide to have screenshots taken of the active window by selecting the so-named option in the dialogue box. Also shown in the dialogue box is the name of the Leelou file to which the screenshots will be stored.

After the screen resolution has been set, the "done" button is pressed. At this point, the author minimizes the Leelou program and launches, or runs, the application program which is to be the subject of the sequence. During the running of the application program, the user depresses the "pause" key on the keyboard at each desired screenshot. The user can also position the cursor within the screenshot, as desired, to facilitate the presentation and description of the application program later.

Figure 6:
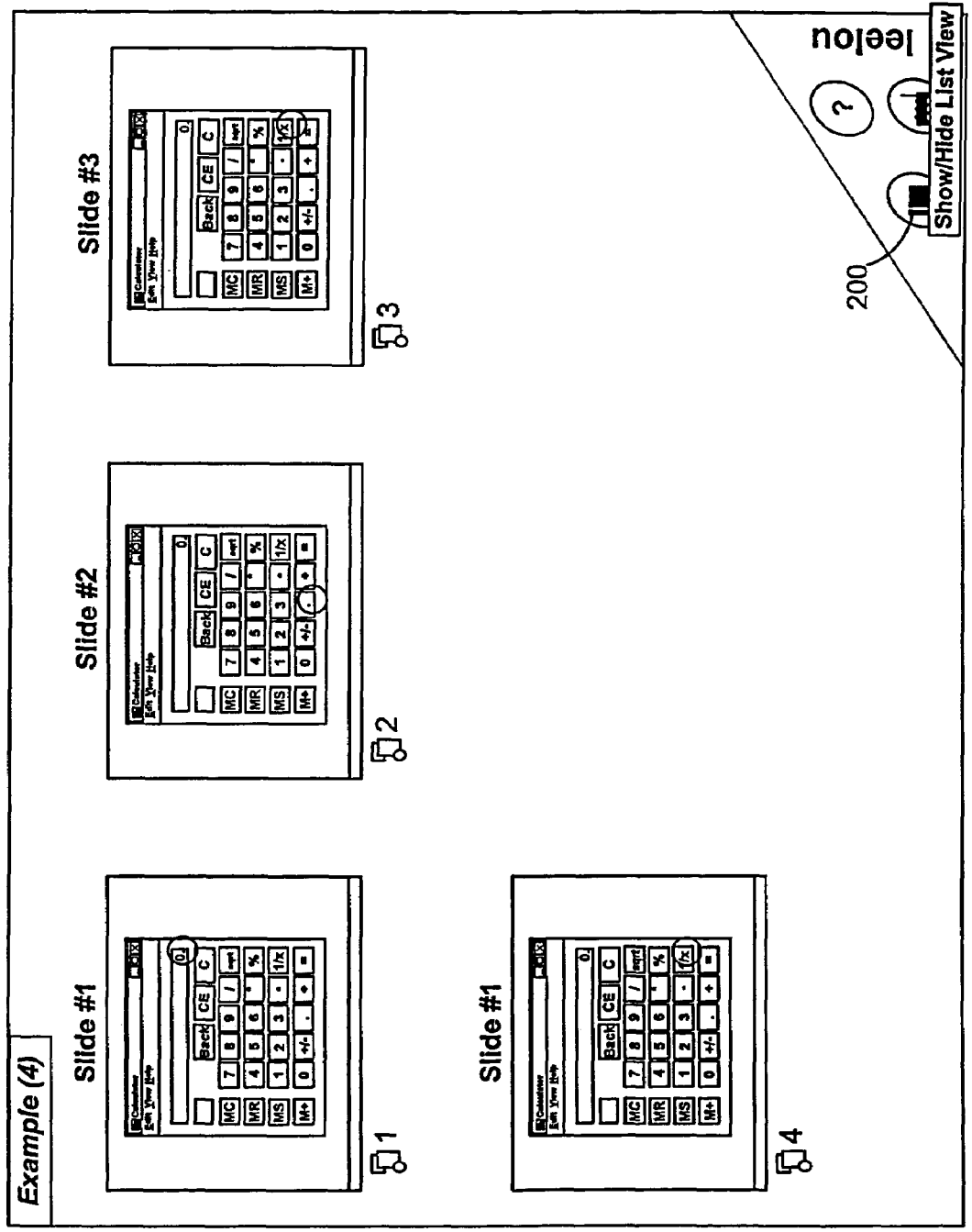
FIG. 6 is a next screen display to illustrate the operation of the invention.

FIG. 6 shows the display in Leelou after several screenshots have been taken. The application program that is the subject of the screenshots is the standard calculator program provided in the Microsoft Windows 95 operating system.

As shown in FIG. 6, 4 screenshots corresponding to slides #1 through #4 are displayed.

Figure 5:
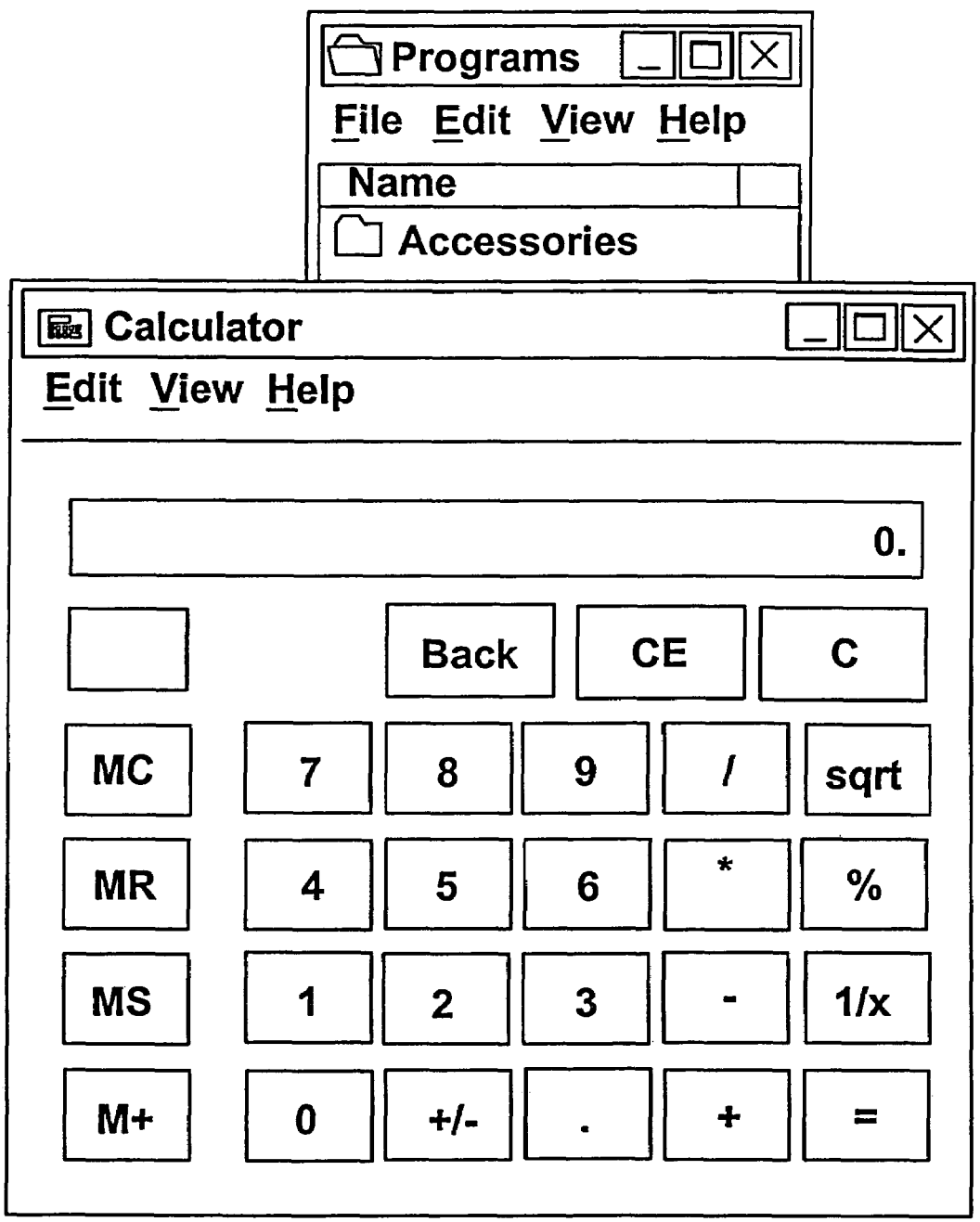
FIG. 5 is a next screen display to illustrate the operation of the invention.

FIG. 5 shows a display of the application program executing. In FIG. 5, the calculator program is created at the display at the center of the screen. The sequence author is operating the calculator interface and can depress the "Pause" key at any time in order to capture a screenshot into the Leelou file. While screenshots are being taken, the number of screenshots currently taken can be determined by moving the mouse pointer over the Leelou button in the taskbar as shown in FIG. 5. After all screenshots have been taken, the author reactivates the Leelou program interface by depressing its button on the task bar.

When the Leelou program is re-activated, the author depresses the "Done" button. Leelou then compresses the captured screenshots and displays them as reduced slides so that multiple screenshots will fit on a single display screen as shown in FIG. 6. In general, the ".leelou" files are compressed before storing them to the hard disk, and are decompressed when retrieving the file from the hard disk so that the screenshots and other information can be readily accessed from RAM.

Figure 7:
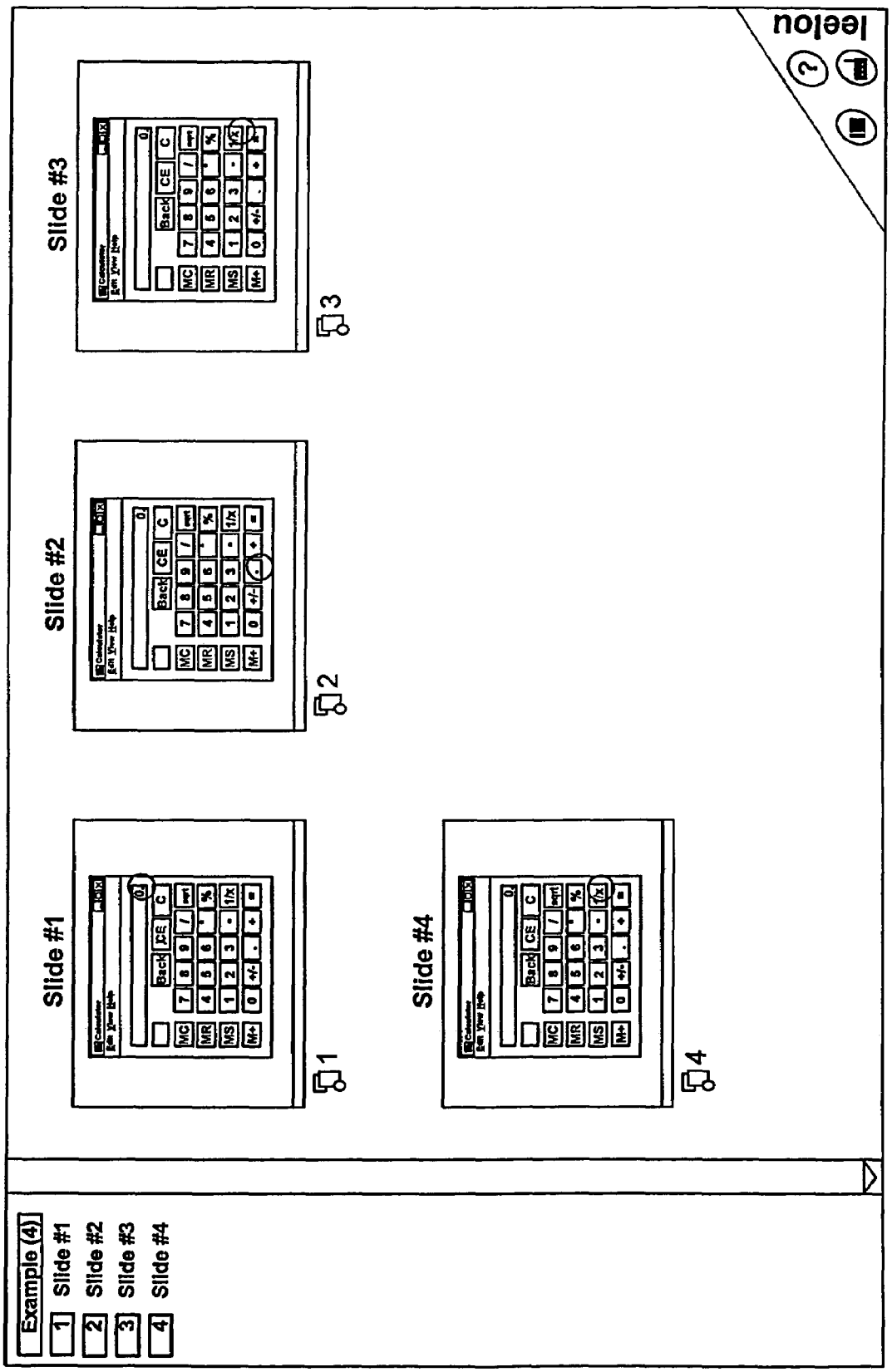
FIG. 7 is a next screen display to illustrate the operation of the invention.

FIG. 6 shows the four slides captured as screenshots during the execution of the calculator application program. In the preferred embodiment, the display resolution is set to a higher resolution than that at which the screenshots were made. The view shown in FIG. 6 is referred to as the "main" view. By depressing button 200, a "list" view can also be made visible as shown in FIG. 7.

Individual slides can be selected, brought into an edit view for editing, rearranged and otherwise manipulated by using either the main or list views. The slides can be selected by clicking on the slide's name, or graphic representation, in either of the views. Slide names can be changed by double clicking on the text for the slide name in either of the views. Slides can be edited by double clicking on the slide graphic in the main view. Slides can be copied, moved or duplicated within these views. Slides, or other images, can also be imported into the list and main views so that previously acquired screenshots, pre-made graphics, photographs, etc. can be incorporated into the sequence. The preferred embodiment of the present invention supports both .gif and .jpg formats of images.

Figure 8:
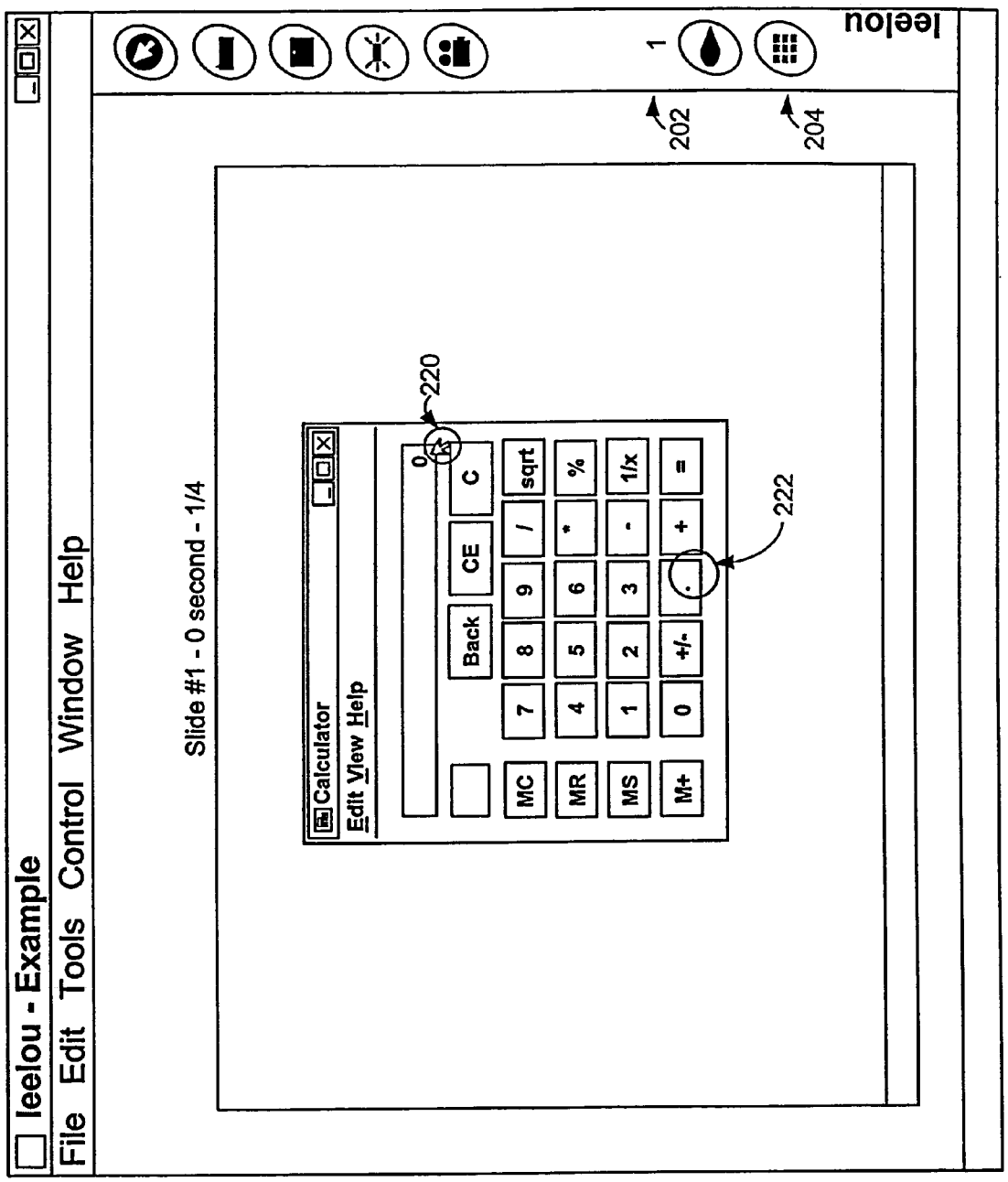
FIG. 8 is a next screen display to illustrate the operation of the invention.

Double-clicking on a slide's graphic in the main view causes that slide to be brought into an "edit" view. FIG. 8 shows the Leelou display after slide #1 has been double clicked to bring it into the edit view.

FIG. 8 shows the Leelou display of frame #1 in the edit view. In FIG. 8, the Leelou control buttons are along the right side of the window. The title of the sequence file is displayed in the title bar at the top along with pull-down menu headers, as shown.

The numeral "1" at 202 indicates what number the slide is in the overall sequence. By right-clicking on this number, a list is brought up of all of the slides in the sequence. Any item in the list can be clicked to bring that respective slide into the edit view. By left-clicking on the slide number at 202, the slide number can be changed to bring up the slide corresponding to the new number. Buttons immediately below, and above (not shown) the slide number at 202 move forward, and backward, respectively, within the slide sequence. The button at 204 can be depressed to return to the main view.

Other buttons on the Leelou button bar at the right of the window of FIG. 8 include, from top to bottom, functions of "add/remove cursor," "add/remove balloon," "add/remove memo," "add/remove click zone" and "show/hide control panel." The use of these buttons is described below.

Editing and checking of the cursor shape and movement can be performed within the edit view as, for example, shown in FIG. 8.

For each slide, the starting cursor position is shown in a light gray circle while the ending cursor position is shown in a darker circle. In the actual leelou interface, extensive use is made of colors which are not reproduced in the Figures of this application. The starting, or "current," cursor position is actually indicated with a green circle and the ending cursor position is shown at a blue circle. This is reproduced in the black and white figures as current cursor position at 220 and ending cursor position at 222 of FIG. 8. A dialogue box for positioning and selecting the cursor shape, is brought up by right-clicking on the current cursor location at 220.

Figure 9:
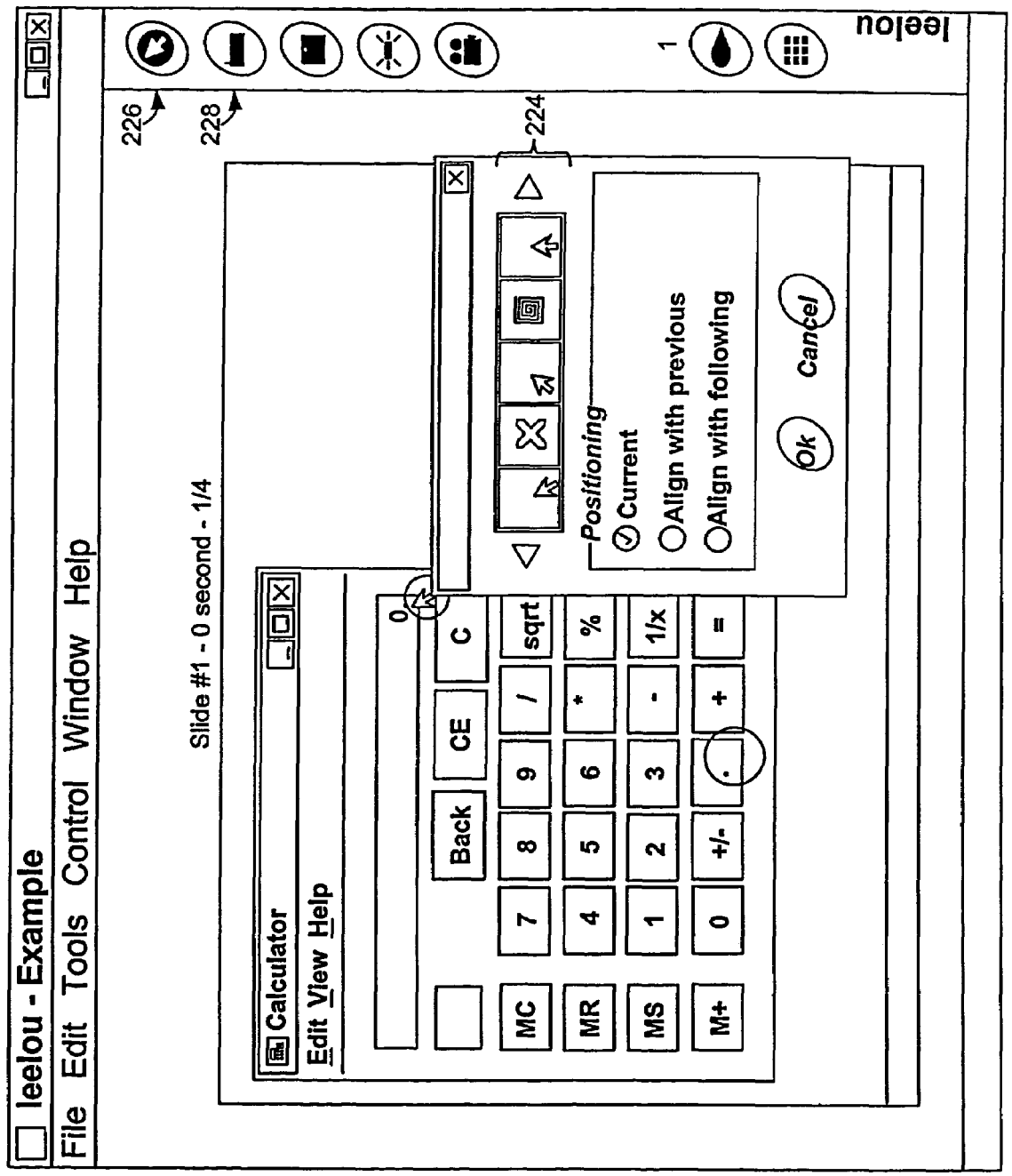
FIG. 9 is a next screen display to illustrate the operation of the invention.

FIG. 9 shows the display after the cursor options dialogue box has been opened by right-clicking at the cursor's current position at 220 of FIG. 8.

In FIG. 9, a cursor type can be selected from a list of different cursor images at 224. The cursor can be made to align with the cursor position of the slide previous to the slide being edited. Also, the cursor position can be made to align with the cursor position of the slide following the slide being edited. Or, the cursor position can be made to reside in the current position as indicated by the green, or lighter shaded, circle. Once the cursor's shape and alignment has been selected, the dialogue box is exited by depressing the "ok" button.

The cursor current position can be changed by clicking and dragging the current cursor position circle to any point on the slide or within the Leelou window.

The add/remove cursor button at 226 can be used to hide the cursor graphic and current location circle.

Figure 10:
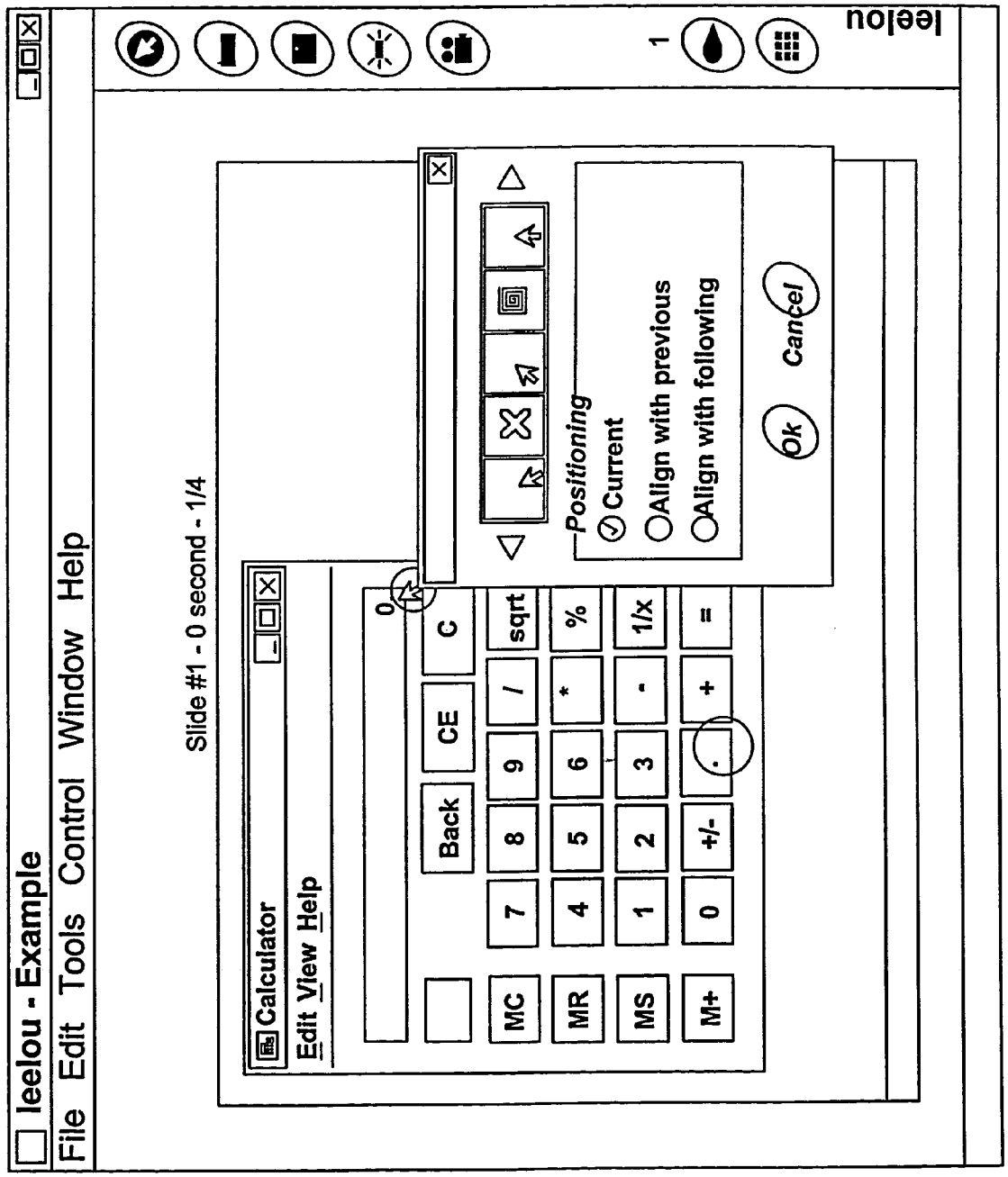
FIG. 10 is a next screen display to illustrate the operation of the invention.
Figure 11:
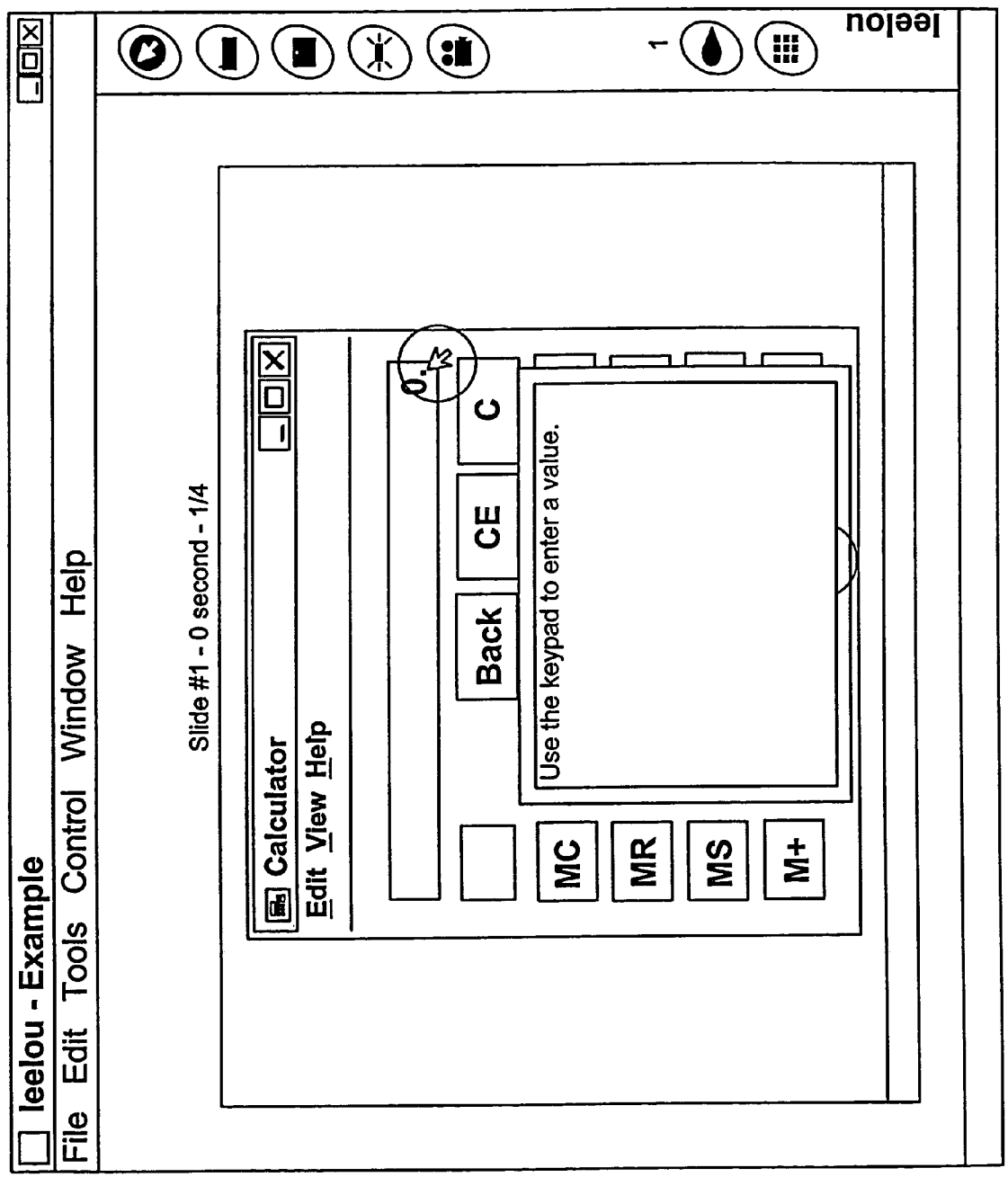
FIG. 11 is a next screen display to illustrate the operation of the invention.
Figure 12:
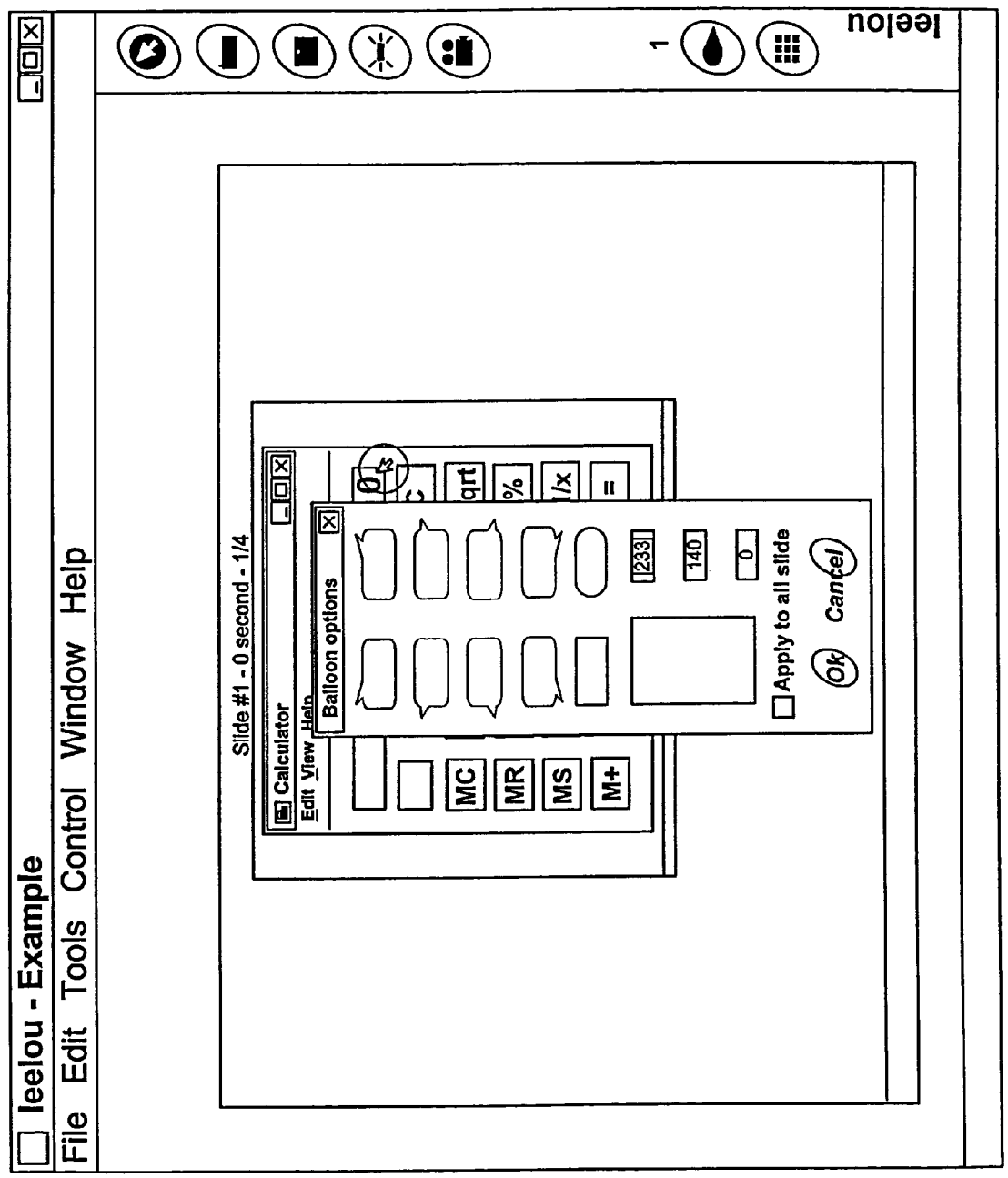
FIG. 12 is a next screen display to illustrate the operation of the invention.
Figure 13:
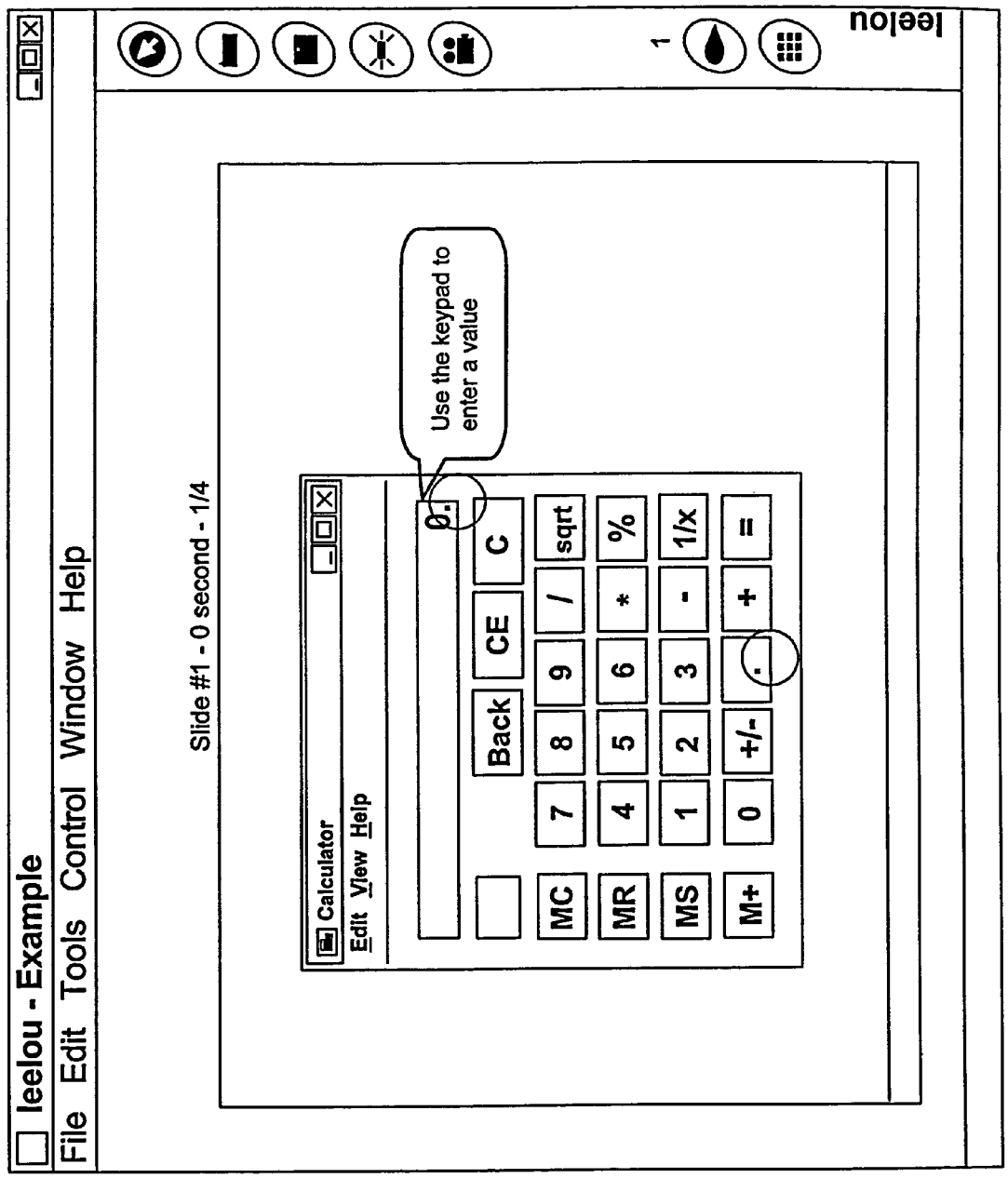
FIG. 13 is a next screen display to illustrate the operation of the invention.

A button to add or remove balloon text is at 228 in FIG. 9. FIG. 10 shows the display including a balloon text dialogue box that appears after the "add/remove balloon" button is depressed. Text can be entered into the balloon text box. In FIG. 10, the text "Use the keypad to enter a value" has been entered in the dialogue box. After entering text, the pointer is moved and a point outside of the balloon text box is clicked to close the text entry. When the cursor is again placed within the closed balloon text box, as shown in FIG. 10, various controls appear within the balloon text box. These controls allow the resizing, moving and closing of the balloon text. Also, by clicking on the down-arrow control in the balloon text box, or by right-clicking within the balloon text box and selecting options in the pop-up menu, further balloon options are presented in another dialogue box. These are shown in FIG. 12. The dialogue box in FIG. 12 allows a sequence author to select the balloon shape and color. For example, the result of repositioning, resizing, and selecting a red color with a left pointer to the balloon of FIG. 11 is shown in FIG. 13.

Figure 14:
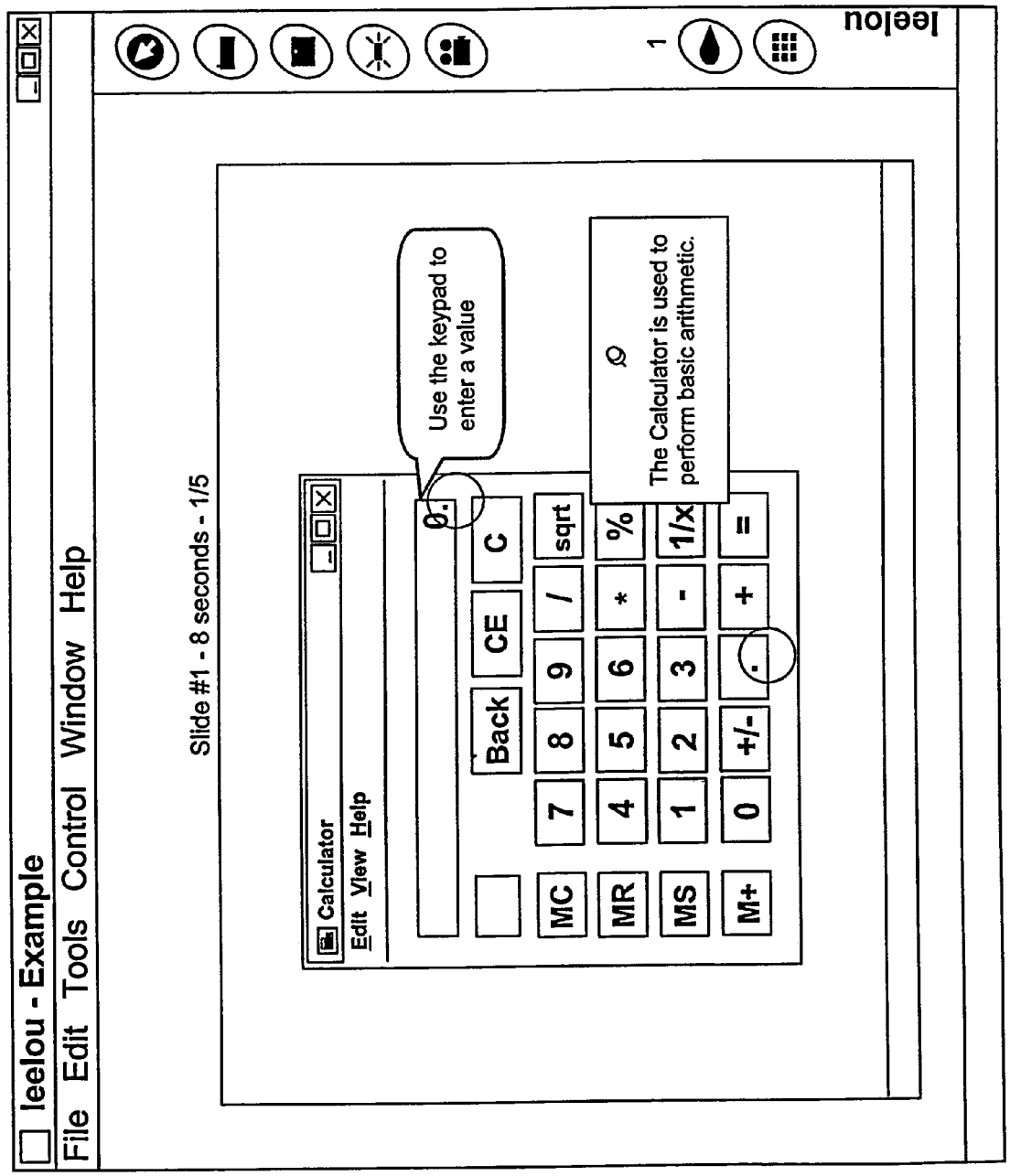
FIG. 14 is a next screen display to illustrate the operation of the invention.

The effect of pressing "add/remove memo" button is shown if FIG. 14. A dialogue box pops up, similar to the balloon text case, so that memo text can be entered. Similar to the balloon text example, when the cursor is positioned within a memo text box, the various controls appear so that the memo box can be resized, repositioned and closed. Memo options are also available by depressing the down-arrow control within the memo textbox. The text can be edited by left-clicking within the memo text box. Additional options include allowing different colors for the memo text box. The bar in the upper left corner of the memo text box fits the memo box size to the text.

By right-clicking within the memo box, a copy option can be selected which copies the text, size, color and any other properties of memo box for pasting into a different slide. The pasting is accomplished by bringing a desired slide into the edit window and allowing the user to press a predetermined key.

Figure 15:
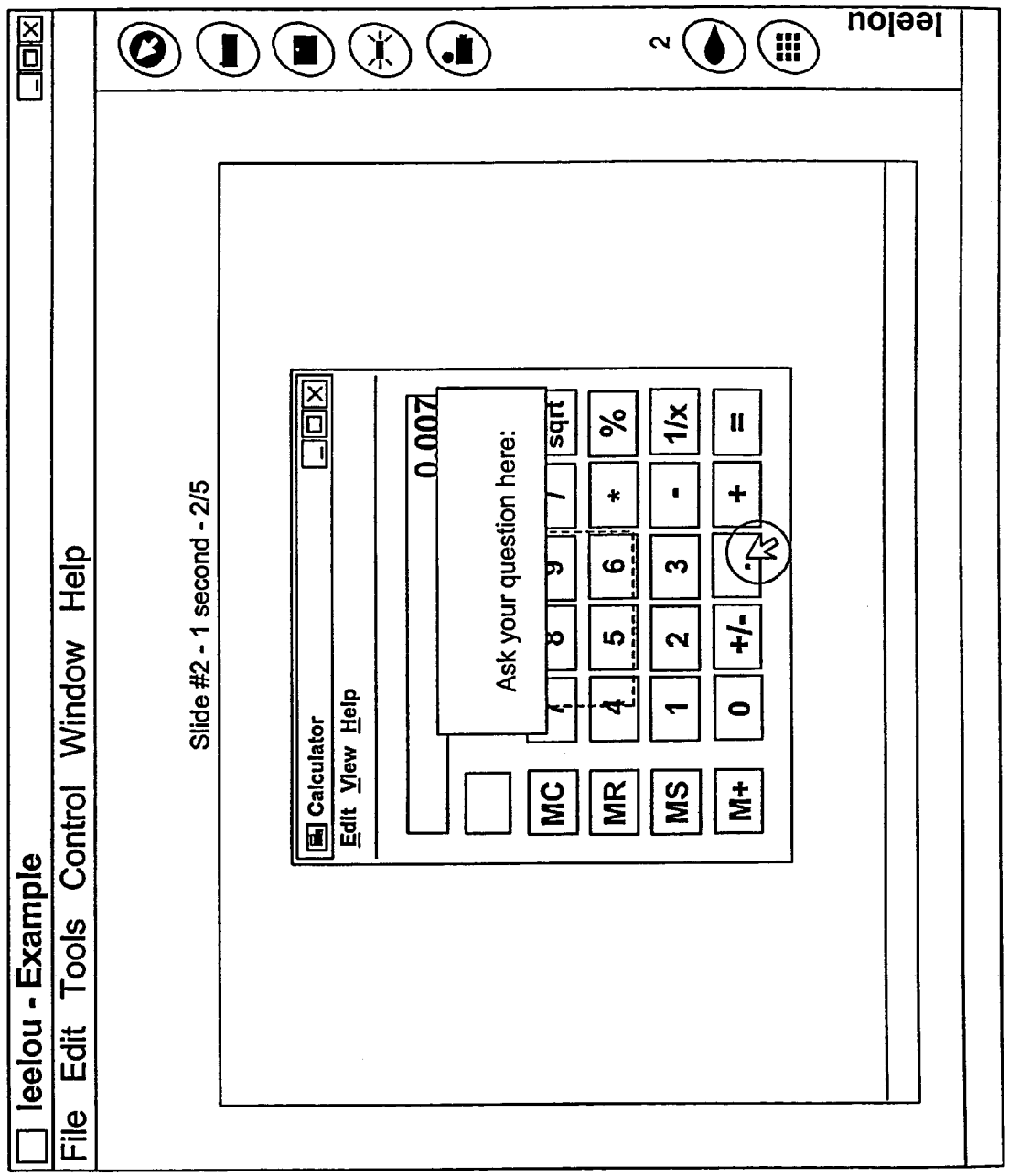
FIG. 15 is a next screen display to illustrate the operation of the invention.
Figure 16:
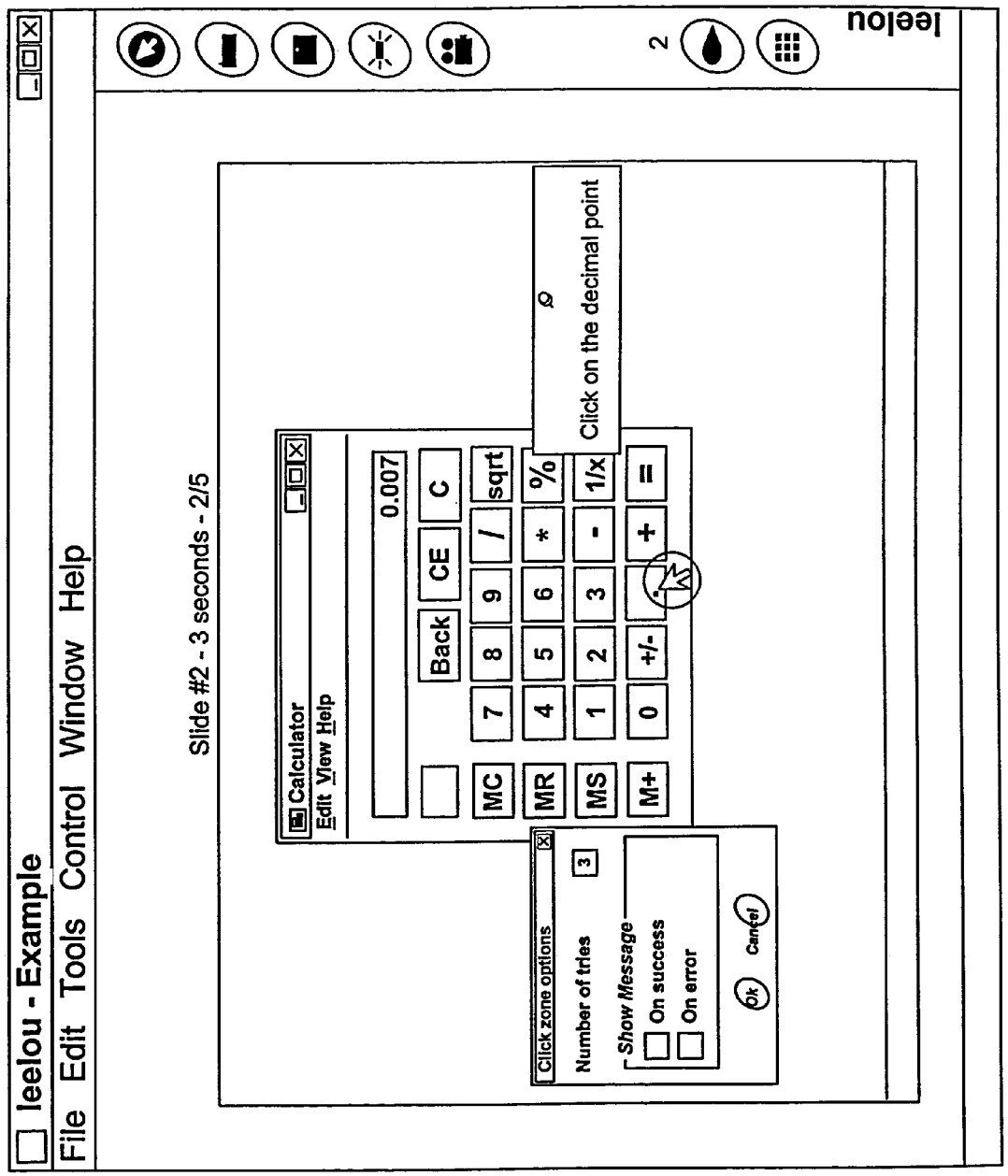
FIG. 16 is a next screen display to illustrate the operation of the invention.

The add/remove "click zone" is the fourth from the top in a Leelou display. By clicking this button, a click zone border and question box appear. The author can reposition and resize the click zone border and can enter text into the question box and reposition, resize and set the color of the question box similar to the balloon and memo text boxes options. FIG. 15 shows the display after the add/remove click zone has been depressed while editing slide #2. The click zone border can be dragged to be placed over any desired zone on the slide. This allows the sequence author to let a user viewing the presentation click in a desired area within the presentation slide. For example, FIG. 16 shows the display of slide #2 where the click area boundary (shown by a dashed line) has been sized and positioned to fit over the decimal point button on the calculator key pad. The question, or instruction, asks the user to "click on the decimal point."

By right-clicking on, or within, the click zone border, the dialogue box shown in FIG. 16 appears so that the author can make the presentation responsive to the user's success or error in clicking in the correct, or incorrect, respectively, areas. The "show message" options are to display a message when the user is successful, or to show a different message when the user is unsuccessful. The number of tries that a user will be allowed before an error message occurs can also be set by the sequence author.

Figure 17:
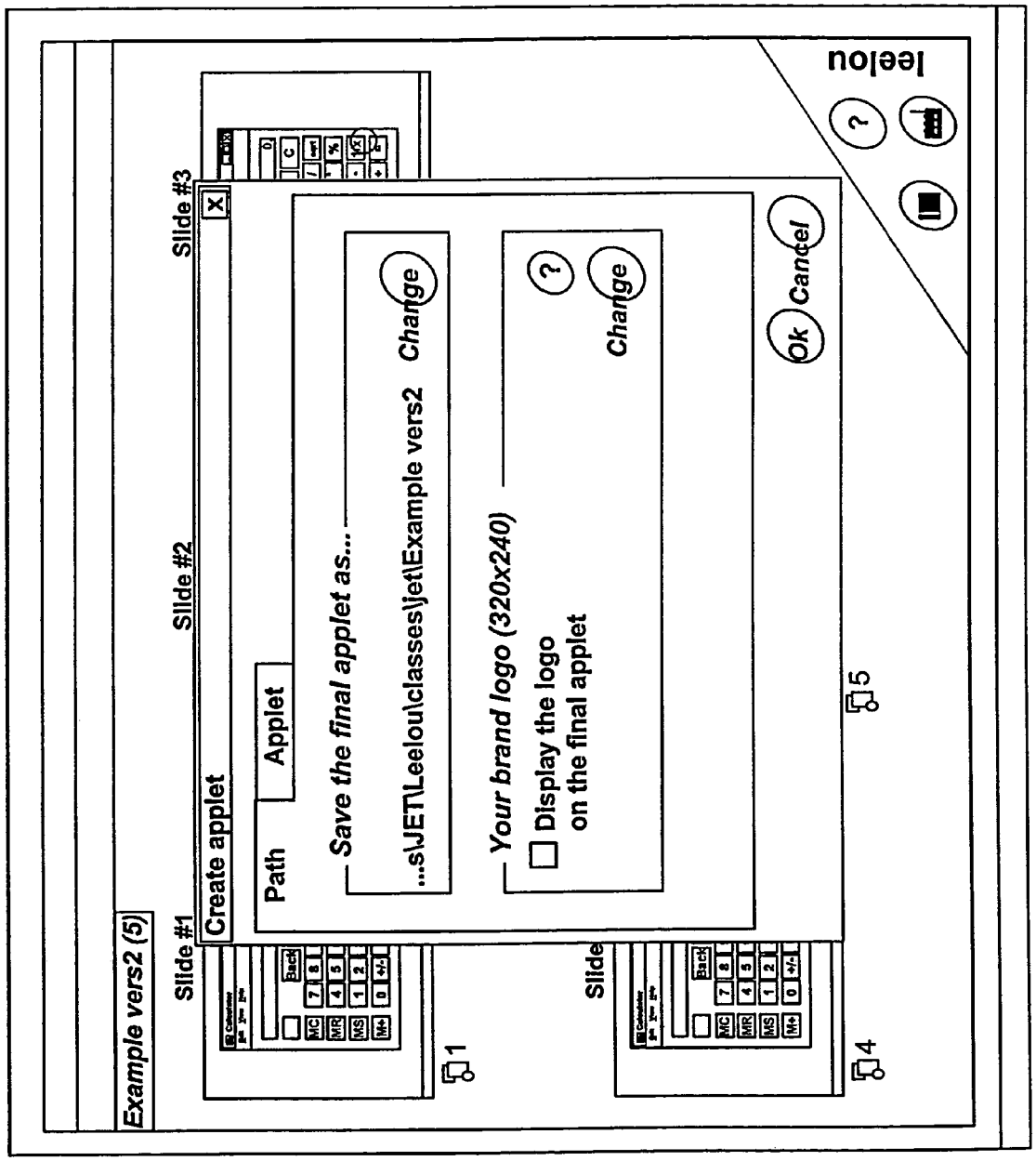
FIG. 17 is a next screen display to illustrate the operation of the invention.

A control panel display can be brought up by depressing the "show/hide control panel" button. This is the fifth button from the top in the Leelou display. FIG. 17 shows the control panel dialogue which is displayed after the "show/hide control panel" button is pressed.

The five buttons at the top of the control panel box allow the author to sequence, or step, through each of the slides in the presentation. The left button displays the first slide in the presentation. The next button to the right displays a slide immediately preceding the currently displayed slide in the edit view. The middle button runs the presentation from the currently viewed slide to till end. This button turns into a pause button which will stop the presentation if pressed while the presentation is running. The next button to the right skips to the slide immediately following the slide currently being viewed in the edit window. The right-most button displays the last slide in the sequence.

The box labeled "preview" in the control panel box allows the author to view the cursor animation for the currently viewed slide in the edit view. When "preview" is clicked, the cursor is animated and the animation repeats itself in a looped fashion. This allows the author to view the speed of the cursor movement. The speed of the cursor movement can be adjusted by dragging the top indicator left or right along the measure bar so that the cursor movement is slower or faster, respectively. The lower measure bar determines the point of transition from the first cursor shape to the second. For example, the cursor can be made to change from a standard pointer to an 'I-beam', used for entering text. The lower measure bar adjusts the point along the cursor travel path at which the transition takes place. Precise adjustment of the transition point may be necessary to make the cursor look realistic.

Additional controls within the control panel of FIG. 17 allow the author to control the amount of time a slide is presented, or displayed, before the next slide is displayed in its place. The "pause" option will display a slide for a predetermined, default, length of time. If the author desires, a specific number of seconds of delay can be set by clicking the "delay" option and by answering a number for the delay in seconds to the right. The "straight move" option will cause the cursor to move from its current point to its final point in a straight line. If this option is not checked, the Leelou program creates a slightly curved path for the cursor movement, instead.

FIG. 17 shows a "Create Applet" dialogue that allows an author to complete the applet for presentation. In FIG. 17, the author can change the name of the completed applet and can choose to display a logo, or other information, on the entry screen that is displayed when the presentation is played back.

Figure 18:
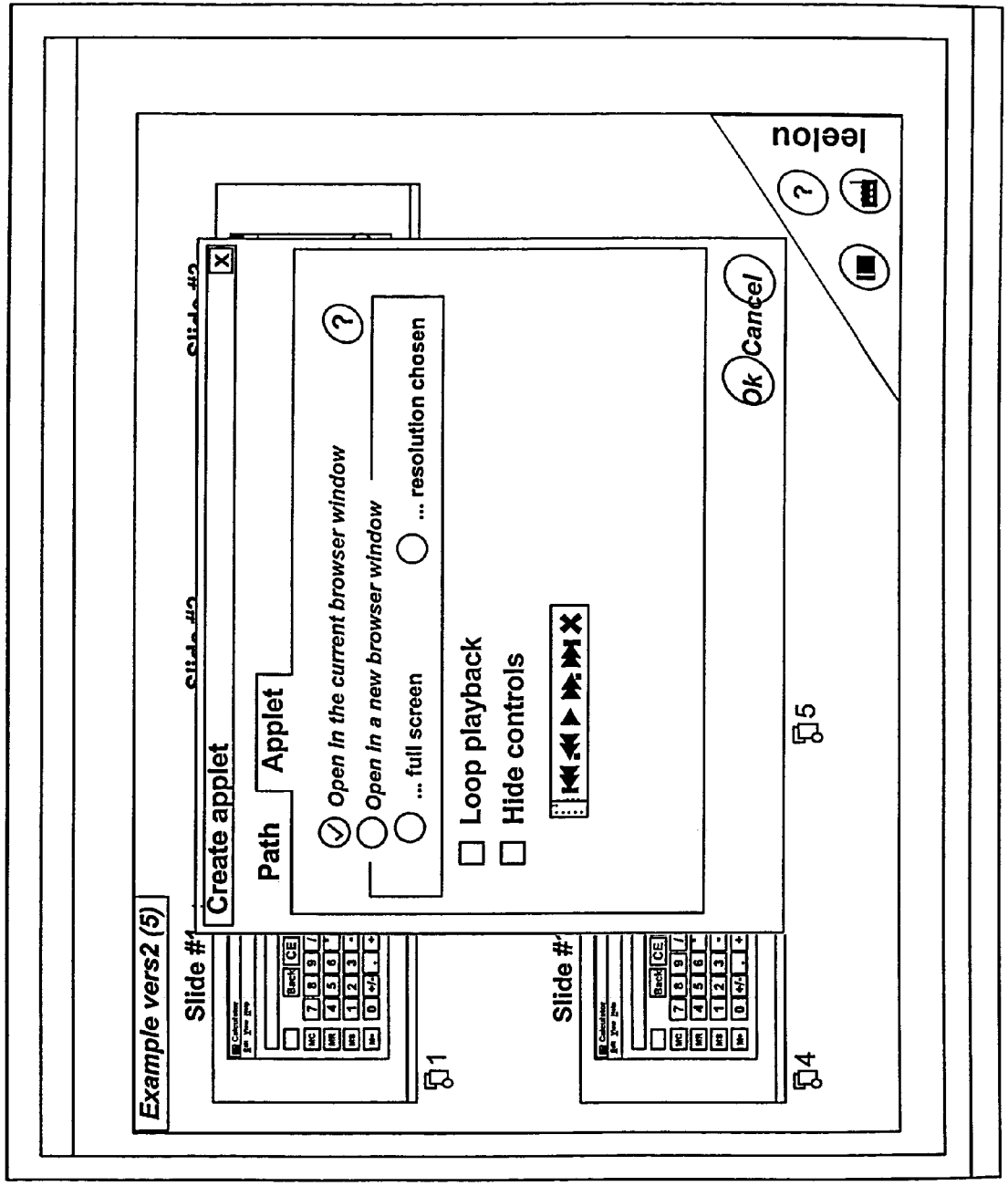
FIG. 18 is a final screen display to illustrate the operation of the invention.

FIG. 18 shows additional options in finalizing the applet. In FIG. 18, controls are shown to allow the author to direct how the applet is played back in a browser. The applet can be presented in a current browser window (i.e., an already-opened window) or a new browser window. The applet can be made to display at the user's full-screen resolution or a default resolution, can be made to loop continuously on playback and can be put under control of the user by allowing the display of the "VCR" controls as shown.

After the author clicks "OK" the applet is built and compressed. A preferred embodiment of the invention uses special compression to reduce the size of the completed applet. The applet is decompressed prior to playback. The routines for performing the compression and decompression of the applet are included in, and completely described by, the source code Appendix.

In view of the discussion above, it should be apparent that the Leelou interface provides many controls and features to allow an author to easily make an effective presentation of a software application. Any software application that generates visual information is susceptible for use with the present invention. Further, the invention can be used to make presentations of other information that is not, necessarily, generated from an application program. An example is where images are being viewed in a viewer, such as a web browser. Or a web browser can be used to view web pages that are captured and made into a presentation. Operating system displays, such as file hierarchies, desktop views, etc., can be captured and formed into a presentation with the present invention. Digital video, such as streaming video, can also be captured, annotated and presented. Other images displayed on a computer can be subject matter for a presentation prepared by the authoring interface and tools of the present invention.

Advertising Model

The present invention provides a novel approach to software distribution and provides a useful revenue model for software manufacturers and vendors. The preferred embodiment of the authoring program, leelou, is available in two commercial versions. A first version provides the features as presented above and is sold to end users. A second version also includes the full feature set as described above, but includes a provision for inserting advertising banners into the presentations. This latter version is provided to authors for free. This model is useful to software publishers because revenue can be obtained from advertisers whose banners are placed into different presentations.

Where a presentation is played back on a computer that is connected to the Internet, the advertising banner can be initialized, updated, or replaced, via an ad server operated by a software manufacturer. This allows changing the advertisement to suit a specific viewing audience or demographic. Also, the ads can be cycled or swapped to increase the number of advertisers that can be supported. Updating of the ads is useful to bill ads to advertisers according to time intervals. Geography can also be a factor in deciding which ads to display in which presentations as, by using queries about the viewer's computer location, ads can be localized.

Where a presentation is played back on a standalone computer, or a computer connected to a local area network (LAN) that is not coupled to the Internet, predetermined "canned" ads are included with the presentation information. These predefined ads are then displayed when the presentation is viewed. When the presentation is viewed on a computer coupled to the Internet then the ads can be updated or changed as described above.

Ads, or other information, can be visual or audible. When images are used, the images, text or other display, can be placed anywhere on the display screen, as desired. Any shape of images can be presented. An image can be a still image or can be animated. It can be displayed continuously or momentarily. Different images can be cycled through. An image can be a link to a web site so that, for example, when a viewer of the presentation clicks on the ad, a browser window to a web page is opened.

Although the invention has been presented with respect to particular embodiments thereof, these embodiments merely illustrate possible embodiments of the invention, the scope of which is determined solely by the appended claims.

What is claimed is:

1. A method for creating with a computer system a presentation of subject matter, comprising:
generating from a computer application program a first screen display of the subject matter and a first cursor position on the first screen display;
storing at least a portion of the first screen display along with the first cursor position at the time of storing;
generating from the computer application program a second screen display of the subject matter and a second cursor position on the second screen display;
storing at least a portion of the second screen display along with the second cursor position at the time of storing;
displaying the stored portion of the first screen display along with a display of the first cursor position;
displaying the second cursor position; and
accepting signals from a user input device of the computer system to allow manipulation of a cursor position to specify cursor animation during playback of the presentation of the subject matter.

2. The method of claim 1 wherein said displaying of the second cursor position comprises displaying the second cursor position at the time of displaying the first cursor position.

3. The method of claim 1 wherein said displaying of the second cursor position comprises displaying the second cursor position at the time of displaying the first screen display.

4. The method of claim 1 additionally comprising:
displaying the stored portion of the second screen display along with the displaying of the second cursor position.

5. The method of claim 1 additionally comprising:
playing at least a portion of the first screen display without any application requiring a separate download.

6. The method of claim 1 additionally comprising:
manipulating at least a portion of the first screen display for placing the portion of the first screen display in a sequence for the presentation of the subject matter.

7. The method of claim 1 additionally comprising:
setting a resolution for the first screen display.

8. The method of claim 1 additionally comprising:
editing at least a portion of the first screen display.

9. The method of claim 1 additionally comprising:
playing the presentation of the subject matter; and
controlling animation of movement of a cursor during the playing of the presentation of the subject matter.

10. The method of claim 9 wherein controlling animation of movement of the cursor is between a cursor starting point and a cursor ending point.

11. The method of claim 9 additionally comprising:
previewing animation of movement of the cursor.

12. The method of claim 9 additionally comprising:
adjusting a speed of the movement of the cursor during the animation of movement of the cursor.

13. The method of claim 1 additionally comprising:
determining a point of transition of a cursor.

14. The method of claim 13 additionally comprising:
determining the point of transition of the cursor from a first cursor shape to a second cursor shape.

15. The method of claim 13 additionally comprising:
adjusting the point of transition of the cursor along a cursor travel path where the transition of the cursor is conducted.

16. The method of claim 1 additionally comprising:
controlling the amount of time for displaying the stored portion of the first screen display.

17. An apparatus for creating a presentation of subject matter, comprising:
a computer system having a display screen, a processor, and a user input device for controlling a cursor on the display screen;
instructions for generating from a computer application program a first screen display of the subject matter and a first cursor position on the first screen display;
instructions for storing at least a portion of the first screen display along with the first cursor position at the time of storing;
instructions for generating from the computer application program a second screen display of the subject matter and a second cursor position on the second screen display;
instructions for storing at least a portion of the second screen display along with the second cursor position at the time of storing;
instructions for displaying the stored portion of the first screen display along with a display of the first cursor position;
instructions for displaying the second cursor position; and
instructions for accepting signals from the user input device of the computer system to allow manipulation of a cursor position to specify cursor animation during playback of the presentation of the subject matter.

18. The apparatus of claim 17 wherein said instructions for displaying of the second cursor position comprise instructions for displaying the second cursor position at the time of displaying the first cursor position.

19. The apparatus of claim 17 wherein said instructions for displaying of the second cursor position comprise instructions for displaying the second cursor position at the time of displaying the first screen display.

20. The method of claim 17 additionally comprising:
instructions for displaying the stored portion of the second screen display along with the displaying of the second cursor position.

21. A computer-readable medium for directing a computer system to create a presentation of subject matter, comprising:
instructions for generating from a computer application program a first screen display of the subject matter and a first cursor position on the first screen display;
instructions for storing at least a portion of the first screen display along with the first cursor position at the time of storing;
instructions for generating from the computer application program a second screen display of the subject matter and a second cursor position on the second screen display;
instructions for storing at least a portion of the second screen display along with the second cursor position at the time of storing;
instructions for displaying the stored portion of the first screen display along with a display of the first cursor position;
instructions for displaying the second cursor position; and
instructions for accepting signals from a user input device of the computer system to allow manipulation of a cursor position to specify cursor animation during playback of the presentation of the subject matter.

22. The computer-readable medium of claim 21 wherein said instructions for displaying of the second cursor position comprise instructions for displaying the second cursor position at the time of displaying the first cursor position.

23. The computer-readable medium of claim 21 wherein said instructions for displaying of the second cursor position comprise instructions for displaying the second cursor position at the time of displaying the first screen display.

24. The computer-readable medium of claim 21 additionally comprising:
instructions for displaying the stored portion of the second screen display along with the displaying of the second cursor position.

25. A method for creating with a computer system a presentation of an application program, the method comprising:
capturing a screen display during execution of the application program, wherein the screen display includes a first cursor;
storing cursor information describing the first cursor at the time of the capturing step; and
animating a second cursor by using the cursor information, wherein the second cursor is animated over the screen display.

26. The method of claim 25 further comprising:
accepting signals from a user input device to modify the cursor information; and
wherein the step of animating the second cursor includes a sub step of using the modified cursor information.

27. The method of claim 26 further comprising:
setting a path of movement of the second cursor.

28. The method of claim 27 further comprising:
setting a starting point for movement of the second cursor.

29. The method of claim 27 further comprising:
setting an ending point for movement of the second cursor.

30. The method of claim 26 wherein animating the second cursor comprises using the modified cursor information to allow manipulation of a cursor position and to specify cursor animation during playback of the presentation of the application program.

31. The method of claim 25 additionally comprising:
storing at least a portion of the screen display.

32. The method of claim 25 wherein the cursor information includes a starting point of the first cursor.

33. The method of claim 32 wherein the cursor information includes an ending point of the first cursor.

34. The method of claim 33 additionally comprising:
providing a first color for the starting point of the first cursor.

35. The method of claim 34 additionally comprising:
providing a second color for the ending point of the first cursor.

36. The method of claim 35 wherein the first color is different from the second color.

37. The method of claim 32 additionally comprising:
storing the starting point; and
displaying the starting point after the starting point is stored.

38. The method of claim 32 additionally comprising:
storing at least a portion of the screen display; and
storing the starting point at the time of storing at least a portion of the screen display.

39. The method of claim 25 additionally comprising:
displaying the starting point of the first cursor within the screen display.

40. The method of claim 25 additionally comprising:
specifying a cursor transition during playback of the presentation of the application program.

41. The method of claim 40 wherein specifying the cursor transition comprises accepting signals from a user input device of the computer system.

42. The method of claim 25 additionally comprising:
compressing the presentation prior to a playback of the presentation of the application program.

43. The method of claim 25 additionally comprising:
playing the screen display without any dedicated engine requiring a separate download.

44. A method for creating with a computer system a presentation of subject matter, comprising:
generating from a computer application program at least one screen display of subject matter of a presentation;
displaying at least a portion of the screen display;
displaying a cursor starting point;
displaying a cursor ending point;
controlling an animation of movement of a cursor for creating the presentation of the subject matter, and
providing a first color for the cursor starting point.

45. The method of claim 44 additionally comprising storing at least a portion of the screen display.

46. The method of claim 44 additionally comprising storing the cursor starting point.

47. The method of claim 46 additionally comprising storing the cursor starting point prior to displaying the cursor starting point.

48. The method of claim 47 additionally comprising storing the cursor starting point at the time of storing the at least one screen display.

49. The method of claim 44 additionally comprising providing a second color for the cursor ending point.

50. The method of claim 49 wherein said first color is different from said second color.

51. The method of claim 44 wherein said generating from a computer application program at least one screen display comprises generating a first screen display, and generating a second screen display.

52. The method of claim 51 wherein said controlling animation of movement of a cursor comprises receiving signals from a user input device of the computer system to allow manipulation of a cursor position and to specify cursor animation during playback of the presentation of the subject matter.

53. The method of claim 44 additionally comprising displaying the cursor starting point within the at least one screen display.

54. The method of claim 44 additionally comprising specifying a cursor transition during playback of the presentation of the subject matter.

55. The method of claim 54 wherein said specifying a cursor transition comprises accepting signals from a user input device of the computer system.

56. The method of claim 44 additionally comprising displaying text in association with the at least one screen display.

57. The method of claim 56 wherein said displaying text comprises accepting signals from a user input device of a computer system.

58. The method of claim 44 additionally comprising compressing the presentation prior to a playback of the presentation of the subject matter.

59. The method of claim 44 wherein said generating from a computer application program at least one screen display comprises executing the computer application program.

60. The method of claim 44 additionally comprising playing the at least one display screen without any application requiring a separate download.

61. The method of claim 44 additionally comprising manipulating the at least one display screen for placing the display screen in a sequence for the presentation of the subject matter.

62. The method of claim 44 additionally comprising editing the at least one display screen.

63. The method of claim 62 wherein said editing comprises adding text to the at least one display screen.

64. The method of claim 44 additionally comprising indicating a number for the display screen for placing the display screen at a location in a sequence of display screens.

65. The method of claim 44 additionally comprising playing the presentation of the subject matter, and controlling the animation of movement of the cursor during the playing of the presentation of the subject matter.

66. The method of claim 44 wherein said controlling an animation of movement of a cursor is between the cursor starting point and the cursor ending point.

67. The method of claim 44 additionally comprising previewing the animation of movement of the cursor.

68. The method of claim 44 additionally comprising determining a point of transition of the cursor.

69. The method of claim 44 additionally comprising determining a point of transition of the cursor from a first cursor shape to a second cursor shape.

70. The method of claim 44 additionally comprising controlling an amount of time for displaying the at least one display screen.

71. The method of claim 44 additionally comprising selecting a balloon option.

72. The method of claim 44 additionally comprising controlling a sequence of the presentation of the subject matter.

73. A method for creating with a computer system a presentation of subject matter, comprising:
generating from a computer application program at least one screen display of subject matter of a presentation;
displaying at least a portion of the screen display;
displaying a cursor starting point;
displaying a cursor ending point;
controlling an animation of movement of a cursor for creating the presentation of the subject matter, and
playing the at least one display screen without any dedicated engine requiring a separate download.

74. A method for creating with a computer system a presentation of subject matter, comprising:
generating from a computer application program at least one screen display of subject matter of a presentation;
displaying at least a portion of the screen display;
displaying a cursor starting point;
displaying a cursor ending point;
controlling an animation of movement of a cursor for creating the presentation of the subject matter, and
setting a resolution for the at least one display screen.

75. A method for creating with a computer system a presentation of subject matter, comprising:
generating from a computer application program at least one screen display of subject matter of a presentation;
displaying at least a portion of the screen display;
displaying a cursor starting point;
displaying a cursor ending point;
controlling an animation of movement of a cursor for creating the presentation of the subject matter, and
selecting a shape for the cursor to obtain a selected cursor shape.

76. The method of claim 75 additionally comprising aligning the selected cursor shape with a cursor position.

77. The method of claim 76 additionally comprising aligning the selected cursor shape with the cursor position.

78. The method of claim 75 wherein the shape for the cursor is selected from a group comprising a pointer shape and an X shape.

79. A method for creating with a computer system a presentation of subject matter, comprising:
generating from a computer application program at least one screen display of subject matter of a presentation;
displaying at least a portion of the screen display;
displaying a cursor starting point;
displaying a cursor ending point;
controlling an animation of movement of a cursor for creating the presentation of the subject matter, and
adjusting a speed of the movement of the cursor during the animation of movement of the cursor.

80. A method for creating with a computer system a presentation of subject matter, comprising:
generating from a computer application program at least one screen display of subject matter of a presentation;
displaying at least a portion of the screen display;
displaying a cursor starting point;
displaying a cursor ending point;
controlling an animation of movement of a cursor for creating the presentation of the subject matter, and
adjusting a point of transition of the cursor along a cursor travel path where the transition of the cursor is conducted.

81. A method for creating with a computer system a presentation of subject matter, comprising:
   generating from a computer application program at least one screen display of subject matter of a presentation;
   displaying at least a portion of the screen display;
   displaying a cursor starting point;
   displaying a cursor ending point;
   controlling an animation of movement of a cursor for creating the presentation of the subject matter, and entering text into a balloon dialogue box.

* * * * *